US012095706B2

(12) United States Patent
Shi et al.

(10) Patent No.: US 12,095,706 B2
(45) Date of Patent: Sep. 17, 2024

(54) INFORMATION DETERMINATION METHOD AND DEVICE, INFORMATION ADJUSTMENT METHOD, THRESHOLD USAGE METHOD, TERMINAL, AND STORAGE MEDIUM

(71) Applicant: ZTE CORPORATION, Shenzhen (CN)

(72) Inventors: Jing Shi, Shenzhen (CN); Peng Hao, Shenzhen (CN); Xianghui Han, Shenzhen (CN); Yu Ngok Li, Hong Kong (CN)

(73) Assignee: ZTE Corporation, Shenzhen (CN)

( * ) Notice: Subject to any disclaimer, the term of this patent is extended or adjusted under 35 U.S.C. 154(b) by 344 days.

(21) Appl. No.: 17/765,377

(22) PCT Filed: Sep. 17, 2020

(86) PCT No.: PCT/CN2020/115875
§ 371 (c)(1),
(2) Date: Mar. 30, 2022

(87) PCT Pub. No.: WO2021/063185
PCT Pub. Date: Apr. 8, 2021

(65) Prior Publication Data

US 2023/0006803 A1 Jan. 5, 2023

(30) Foreign Application Priority Data

Sep. 30, 2019 (CN) ......................... 201910944446.2

(51) Int. Cl.
*H04W 72/04* (2023.01)
*H04L 5/00* (2006.01)
*H04W 72/23* (2023.01)

(52) U.S. Cl.
CPC .......... *H04L 5/0058* (2013.01); *H04L 5/0092* (2013.01); *H04W 72/23* (2023.01)

(58) Field of Classification Search
CPC ................. H04L 5/0007; H04L 5/0053; H04L 27/26025; H04L 5/001; H04L 5/0058;
(Continued)

(56) References Cited

U.S. PATENT DOCUMENTS

2019/0253308 A1 8/2019 Huang et al.
2019/0274032 A1 9/2019 Chatterjee et al.
2022/0338039 A1 10/2022 Takahashi et al.

FOREIGN PATENT DOCUMENTS

CN 110115008 A 8/2019
CN 110167036 A 8/2019
(Continued)

OTHER PUBLICATIONS

Taiwanese office action issued in TW Patent Application No. 109133406, dated Dec. 11, 2023, 6 pages. English machine translation included.
(Continued)

*Primary Examiner* — Phuc H Tran
(74) *Attorney, Agent, or Firm* — Perkins Coie LLP

(57) ABSTRACT

Provided are an information determination method and device, an information adjustment method, a threshold usage method, a terminal, and a storage medium. The information determination method includes: determining a second threshold of a target subcarrier spacing according to the number of cells that meet a first set condition, the total number of downlink cells, the number of supported cells reported by a terminal, and a first threshold.

20 Claims, 5 Drawing Sheets

(58) Field of Classification Search
CPC .... H04L 5/0092; H04W 72/23; H04W 24/08; H04W 72/0453; H04W 74/08; H04W 72/044; H04W 72/21; H04W 72/56
See application file for complete search history.

(56) References Cited

FOREIGN PATENT DOCUMENTS

| | | | | | |
|---|---|---|---|---|---|
| CN | 110620645 | A | * | 12/2019 | ........... H04L 5/0007 |
| CN | 111093270 | A | * | 5/2020 | ......... H04L 25/0238 |
| CN | 112312555 | A | * | 2/2021 | ........... H04L 1/0038 |
| EP | 4037398 | A1 | * | 8/2022 | ....... H04L 27/26025 |
| RU | 2690695 | C1 | | 6/2019 | |
| VN | 10036722 | B | * | 8/2023 | ........... H04L 1/0038 |
| WO | WO-2018059601 | A1 | | 4/2018 | |
| WO | WO-2019032821 | A1 | | 2/2019 | |
| WO | WO-2019099435 | A1 | | 5/2019 | |
| WO | WO-2019143164 | A1 | | 7/2019 | |
| WO | WO-2019160816 | A1 | | 8/2019 | |
| WO | 2021059524 | A1 | | 4/2021 | |
| WO | WO-2021062687 | A1 | * | 4/2021 | |

OTHER PUBLICATIONS

International Search Report for Application No. PCT/CN2020/115875, dated Dec. 8, 2020, 6 pages including English translation.
European Search Report issued in EP Patent Application No. 20871494.9, dated Oct. 20, 2023, 14 pages.
Qualcomm Incorporated, "PDCCH Enhancements for eURLLC," 3GPP TSG-RAN WG1 Meeting #96b, R1-1905019, Apr. 8-12, 2019, Xi'an, China, 11 pages.
Mediatek Inc., "PDCCH enhancements for eURLLC," 3GPP TSG RAN WG1 Meeting #97, R1-1906565, Reno, USA, May 13-17, 2019, 13 pages.
Intel Corporation, "Downlink control enhancements for eURLLC," 3GPP TSG RAN WG1 #98, R1-1908645, Prague, CZ, Aug. 26-30, 2019, 15 pages.
MCC Support, "Final Report of 3GPP TSG RAN WG1 #97 v1.0.0," 3GPP TSG RAN WG1 Meeting #98, R1-1907973, Prague, Czech Republic, Aug. 26-30, 2019, 163 pages.
ETSI TS 138 213 V16.4.0 (Jan. 2021), Technical Specification, "5G; NR; Physical layer procedures for control (3GPP TS 38.213 version 16.4.0 Release 16)," 185 pages.
3GPP TS 38.331 V16.4.0 (Mar. 2021), Technical Specification, "3rd Generation Partnership Project; Technical Specification Group Radio Access Network; NR; Radio Resource Control (RRC) protocol specification (Release 16)," 949 pages.
ZTE, "On PDCCH enhancements for NR URLLC," 3GPP TSG RAN WG1 #98bis, R1-1910100, Chongqing, China, Oct. 14-20, 2019, 15 pages.
3GPP TS 38.211 V16.0.0 (Dec. 2019), Technical Specification, "3rd Generation Partnership Project; Technical Specification Group Radio Access Network; NR; Physical channels and modulation (Release 16)," 129 pages.
3GPP TS 38 213 V16.0.0 (Dec. 2019), Technical Specification, "3rd Generation Partnership Project; Technical Specification Group Radio Access Network; NR; Physical layer procedures for control (Release 16)," 146 pages.
3GPP TS 38.331 V16.0.0 (Mar. 2020), Technical Specification, "3rd Generation Partnership Project; Technical Specification Group Radio Access Network; NR; Radio Resource Control (RRC) protocol specification (Release 16)," 835 pages.
3GPP TS 38.211 V16.4.0 (Dec. 2020), Technical Specification, "3rd Generation Partnership Project; Technical Specification Group Radio Access Network; NR; Physical channels and modulation (Release 16)," 133 pages.
Examination Report for Indian Patent Application No. 202227024836, dated Oct. 10, 2022, 6 pages.
Japanese office action issued in JP Patent Application No. 2022-520153, dated May 16, 2023, 6 pages. English machine translation included.
Russian office action issued in RU Patent Application No. 2022111730, dated Dec. 6, 2022, 20 pages. English machine translation included.
Russian Decision to Grant issued in RU Patent Application No. 2022111730, dated Apr. 6, 2023, 22 pages. English machine translation included.
Japanese Notice of Allowance issued in JP Patent Application No. 2022-520153, dated Nov. 14, 2023, 3 pages. English translation included.
International Preliminary Report on Patentability issued in International Patent Application No. PCT/CN2020/115875, dated Apr. 5, 2022, 12 pages. English translation included.
Written Opinion issued in International Patent Application No. PCT/CN2020/115875, dated Apr. 5, 2022, 10 pages. English translation included.
European Search Report issued in EP Patent Application No. 23181815.4, dated Nov. 20, 2023, 12 pages.

* cited by examiner

| Terminal capability | Symbol | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|
| Configured | Monitoring opportunities | | 0 | | | | 1 | | | | 2 | | 3 | | 4 |
| | Monitoring opportunities | | | 5 | | | | 6 | | | | 7 | | | |

FIG. 5

| Terminal capability | Symbol | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|
| | Monitoring opportunities | | 0 | | | | 1 | | | | 2 | | 3 | | 4 |
| | Monitoring opportunities | | | | | | | 6 | | | | | | | |
| (2, 3) and (4, 3) and (7, 3) | Span | | | | | | | | | | | | | | |

FIG. 6

| Terminal capability | Symbol | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|
| Configured | Monitoring opportunities | | 3 | | | | 3 | | | | 3 | | 3 | | 3 |
| | Monitoring opportunities | | | 0 | | | | 1 | | | | 2 | | | |

FIG. 7

| Terminal capability | Symbol | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|
| | Monitoring opportunities | | | | | | 3 | | | | 3 | | 3 | | 3 |
| | Monitoring opportunities | | | 0 | | | | 1 | | | | 2 | | | |
| (2, 3) and (4, 3) and (7, 3) | Span | | | | | | | | | | | | | | |

FIG. 8

INFORMATION DETERMINATION METHOD AND DEVICE, INFORMATION ADJUSTMENT METHOD, THRESHOLD USAGE METHOD, TERMINAL, AND STORAGE MEDIUM

CROSS-REFERENCE TO RELATED APPLICATIONS

This is a National Stage Application filed under 35 U.S.C. 371 based on International Patent Application No. PCT/CN2020/115875, filed on Sep. 17, 2020, which claims priority to Chinese Patent Application No. 201910944446.2 filed on Sep. 30, 2019, the disclosures of both of which are incorporated herein by reference in their entireties.

TECHNICAL FIELD

The present application relates to the field of communications and, for example, to an information determination method and apparatus, an information adjustment method, a threshold usage method, a terminal, and a storage medium.

BACKGROUND

The 4th Generation mobile communication technology (4G) Long-Term Evolution (LTE)/Long-Term Evolution Advance (LTE-Advanced/LTE-A) and the 5th Generation mobile communication technology (5G) are facing increasing requirements. From the perspective of the development trend, the researches on 4G and 5G systems have the characteristics which support enhanced mobile broadband, ultra-reliable and low latency transmission and massive connectivity.

To support the characteristics of ultra-reliable and low latency transmission, transmission needs to be carried out with a short transmission time interval and a low bit rate, where the short transmission time interval may be a single orthogonal frequency division multiplexing (OFDM) symbol or multiple symbols. For a physical downlink control channel (PDCCH), transmission opportunities may be provided at multiple occasion positions in a slot to reduce a waiting time after data arrives, thereby ensuring the low-latency transmission and ensuring the high reliable transmission through a high aggregation level. In a cell aggregation system, the maximum number of PDCCH detection candidate sets that the terminal needs to support and the maximum number of non-overlapping control channel elements (CCEs) that the terminal needs to support are defined in each slot for each type of subcarrier spacing. However, when the enhanced PDCCH monitoring capability of the terminal is introduced, in a cell aggregation scenario, no efficient way to determine a second threshold of each type of subcarrier spacing in each span is proposed.

SUMMARY

Embodiments of the present application provide an information determination method and device, an information adjustment method, a threshold usage method, a terminal, and a storage medium.

The embodiments of the present application provide an information determination method. The method includes the following: a second threshold of a target subcarrier spacing is determined according to the number of cells that meet a first set condition, the total number of downlink cells, the number of supported cells reported by a terminal, and a first threshold.

The embodiments of the present application further provide a threshold usage method. The method includes the following: a method for using different thresholds is determined according to one of the following manners.

Different thresholds are used for different downlink control information formats respectively.

Different thresholds are used for different search spaces respectively.

Different search space sets are configured for the same threshold, and different sub-thresholds are configured for the different search space sets respectively.

The embodiments of the present application further provide an information adjustment method.

The method includes the following: in a case where the number of monitoring opportunities corresponding to search spaces exceeds a set threshold, monitoring opportunities that meet a set condition are discarded.

The embodiments of the present application further provide an information adjustment method.

The method includes the following: in a case where a granularity configuration parameter of an enhanced frequency domain resource allocation type 1 is not configured, a default value of the granularity configuration parameter is determined as: one resource block (RB); or one resource block group (RBG); or one RBG in a case where RBGs are configured or one RB in a case where no RBG is configured.

The embodiments of the present application provide an information determination apparatus. The information determination apparatus includes a threshold determination module.

The threshold determination module is configured to determine a second threshold of a target subcarrier spacing according to the number of cells that meet a first set condition, the total number of downlink cells, the number of supported cells reported by a terminal, and a first threshold.

The embodiments of the present application provide a terminal. The terminal includes a memory and one or more processors.

The memory is configured to store one or more programs.

The one or more programs, when executed by the one or more processors, enable the one or more processors to perform any one of methods described in the embodiments of the present application.

The embodiments of the present application provide a base station. The base station includes a memory and one or more processors.

The memory is configured to store one or more programs.

The one or more programs, when executed by the one or more processors, enable the one or more processors to perform any one of methods described in the embodiments of the present application.

The embodiments of the present disclosure provide a storage medium. The storage medium stores a computer program which, when executed by a processor, performs any one of methods described in the embodiments of the present application.

The preceding embodiments and other aspects of the present application and implementations thereof are described in more detail in the description of drawings, detailed description, and claims.

BRIEF DESCRIPTION OF DRAWINGS

FIG. 5 is a structural diagram of an original monitoring opportunity configuration according to an embodiment of the present application;

FIG. 6 is a structural diagram of a monitoring opportunity configuration after discarding processing according to an embodiment of the present application;

FIG. 7 is a structural diagram of another original monitoring opportunity configuration according to an embodiment of the present application;

FIG. 8 is a structural diagram of another monitoring opportunity configuration after discarding processing according to an embodiment of the present application.

DETAILED DESCRIPTION

Figure 1:
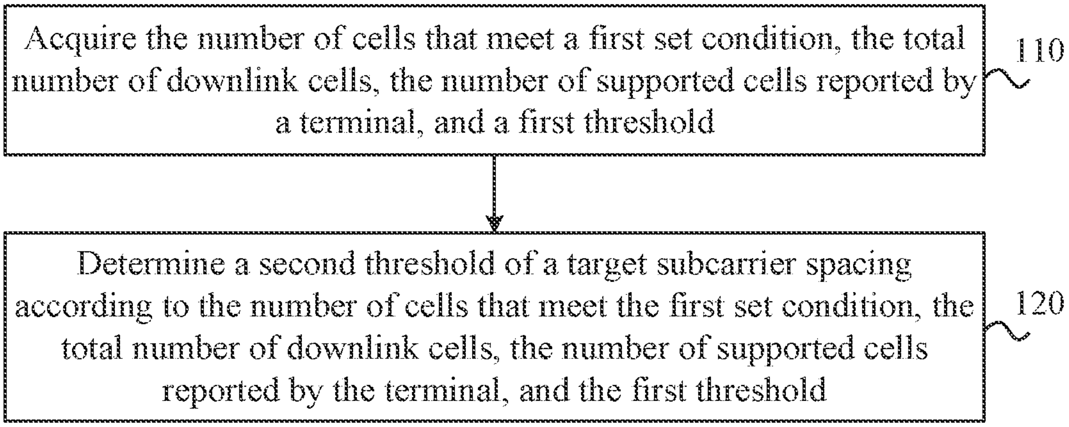
FIG. 1 is a flowchart of an information determination method according to an embodiment of the present application.

Embodiments of the present application are described hereinafter in conjunction with drawings. It is to be noted that if not in collision, the embodiments described herein and the features thereof may be combined with each other.

In a New Radio (NR) system, the maximum number of PDCCH detection candidate sets that a terminal needs to support and the maximum number of non-overlapping CCEs that a terminal needs to support are defined in each slot for each type of subcarrier spacing, as shown in Table 1 where μ that equals to 0, 1, 2 and 3 represents subcarrier spacing of 15 KHz, 30 KHz, 60 KHz and 120 KHz, respectively. For ease of description, the "maximum number of PDCCH detection candidate sets (also called maximum number of blind decode times)" is referred to as the "maximum BD", and the "maximum number of non-overlapping CCEs" is referred to as the "maximum CCE value".

TABLE 1

| Maximum number of PDCCH detection candidate sets and maximum number of non-overlapping CCEs per slot per cell | | |
|---|---|---|
| μ | Maximum number of PDCCH detection candidate sets ($M_{PDCCH}^{max,\ slot,\ \mu}$) | Maximum number of non-overlapping CCEs ($C_{PDCCH}^{max,\ slot,\ \mu}$) |
| 0 | 44 | 56 |
| 1 | 36 | 56 |
| 2 | 22 | 48 |
| 3 | 20 | 32 |

In a cell aggregation system, the maximum number of PDCCH detection candidate sets that the terminal needs to support and the maximum number of non-overlapping CCEs that the terminal needs to support do not always increase linearly with the increase of the number of aggregated cells, but are limited by the support capability of the terminal to report the number of cells ($N_{cells}^{cap}$).

If the terminal is configured with $N_{cells}^{DL,\mu}$ downlink cells, when $$\sum_{\mu=0}^{3} N_{cells}^{DL,\mu} > N_{cells}^{cap},$$

the maximum number of PDCCH detection candidate sets in each slot for each type of subcarrier spacing is $$M_{PDCCH}^{total,slot,\mu} = \left\lfloor N_{cells}^{cap} \cdot M_{PDCCH}^{max,slot,\mu} \cdot N_{cells}^{DL,\mu} / \sum_{j=0}^{3} N_{cells}^{DL,j} \right\rfloor,$$

and the maximum number of non-overlapping CCEs in each slot for each type of subcarrier spacing is $$C_{PDCCH}^{total,slot,\mu} = \left\lfloor N_{cells}^{cap} \cdot C_{PDCCH}^{max,slot,\mu} \cdot N_{cells}^{DL,\mu} / \sum_{j=0}^{3} N_{cells}^{DL,j} \right\rfloor,$$

respectively.

When the enhanced PDCCH monitoring capability of the terminal is introduced, the maximum number of non-overlapping CCEs and the maximum number of PDCCH detection candidate sets of each span are defined. In the cell aggregation scenario, when the limitation of the support capability of the terminal to report the number of cells is received, in the related art, no effective way to determine the maximum number of non-overlapping CCEs and the maximum number of PDCCH detection candidate sets in each span for each type of subcarrier spacing is proposed.

The embodiments of the present application provide an information determination method to solve the above-mentioned problems.

FIG. 1 is a flowchart of an information determination method according to an embodiment of the present application. The method may be performed by an information determination apparatus.

The information determination apparatus may be implemented by software and/or hardware. As shown in FIG. 1, the method includes S110 and S120.

In S110, the number of cells that meet a first set condition, the total number of downlink cells, the number of supported cells reported by a terminal, and a first threshold are acquired.

In S120, a second threshold of a target subcarrier spacing is determined according to the number of cells that meet the first set condition, the total number of downlink cells, the number of supported cells reported by the terminal, and the first threshold.

The first set condition includes at least one of the following: a subcarrier spacing of a scheduling cell is the target subcarrier spacing; or a subcarrier spacing of a scheduling cell is the target subcarrier spacing and a span pattern is obtained based on a same first parameter.

The target subcarrier spacing may be any one or several of the subcarrier spacing defined by the protocol. For example, the subcarrier spacing is represented using μ, and different subcarrier spacing may be distinguished by the value of μ. For example, in Table 1, μ that equals to 0, 1, 2, and 3 represents the subcarrier spacing of 15 KHz, 30 KHz, 60 KHz, and 120 KHz, respectively.

The first parameter is a candidate (X, Y) combination reported by the terminal, and the first parameter may be expressed as Combination (X, Y). For example, a span pattern in a slot is determined through a candidate (X, Y) set reported by the terminal and a PDCCH control resource set (CORESET) as well as a search space. No overlap is allowed between spans, and an interval between starts of two spans is not less than X symbols. The span duration equals to maximum (maximum configured CORESET duration, minimum Y reported by the terminal), and only a last span in the span pattern may be a shorter duration. The number of spans does not exceed floor (14/X), where X is the minimum X in Combinations (X, Y) reported by the terminal. Optionally, Combination (X, Y) include at least one of: (1, 1), (2, 1), (2, 2), (4, 1), (4, 2), (4, 3), (7, 1), (7, 2) or (7, 3). Optionally, the candidate (X, Y) set reported by the terminal includes at least one of: {(7, 3)}, {(4, 3), (7, 3)} or {(2, 2), (4, 3), (7, 3)}.

Figure 2:
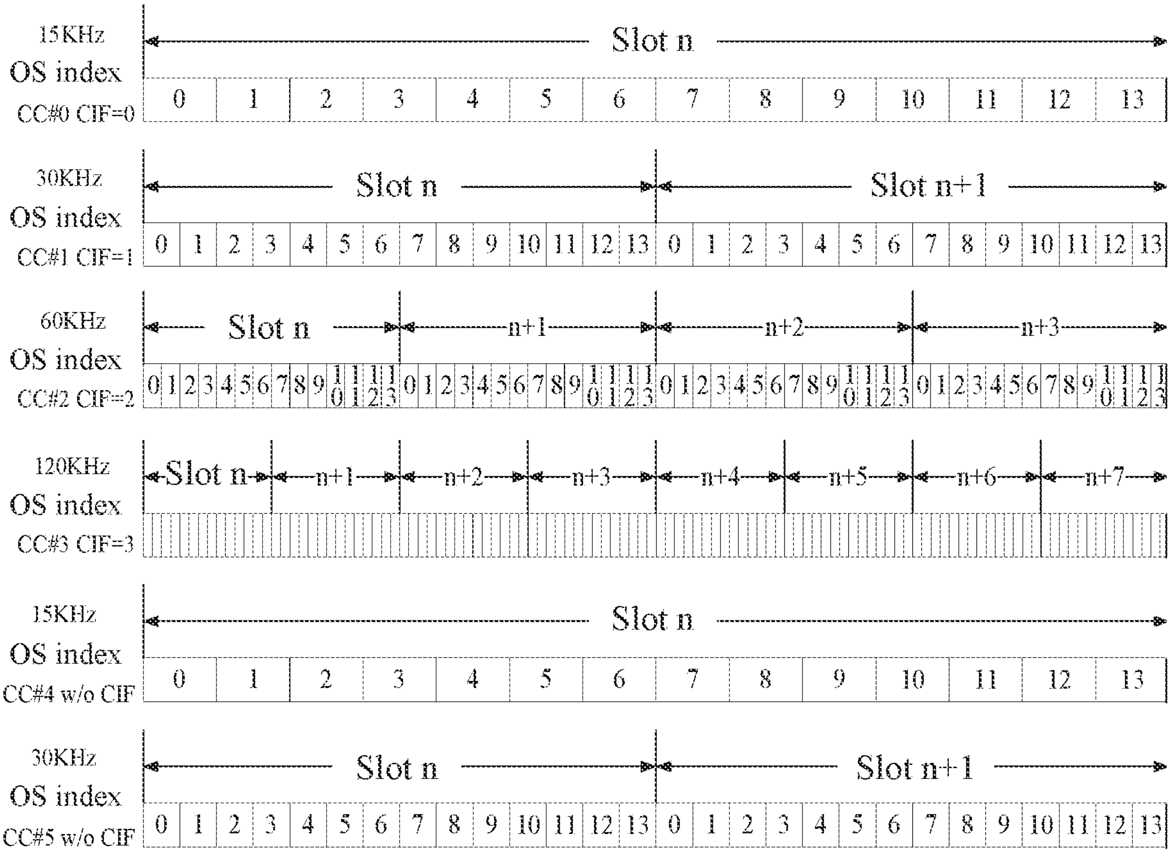
FIG. 2 is a structural schematic diagram of a frame structure according to an embodiment of the present application.

Taking the maximum number of non-overlapping CCEs as an example, when the enhanced PDCCH monitoring capability of the terminal is introduced, the maximum number of non-overlapping CCEs of each span is defined, as shown in FIG. 2.

TABLE 2

Maximum number of non-overlapping CCEs per span per cell

| | | | C (Maximum number of non-overlapping CCEs $C_{PDCCH}^{max,\ span(X,\ Y),\ \mu}$) | | | |
|---|---|---|---|---|---|---|
| | X | Y | μ = 0 | μ = 1 | μ = 2 | μ = 3 |
| Combination 1 | 2 | 2 | 16 | 16 | 16 | 16 |
| Combination 2 | 4 | 3 | 36 | 36 | 32 | 24 |
| Combination 3 | 7 | 3 | 56 | 56 | 48 | 32 |

For example, assuming that the target subcarrier spacing is 60 KHz, the number of cells that meet the first set condition may be the sum of all scheduling cells whose subcarrier spacing is 60 KHz. In another example, assuming that the target subcarrier spacing is 15 KHz and scheduling cells divides span patterns according to (X, Y)=(2, 2) and (X, Y)=(4, 3), respectively, the number of cells that meet the first set condition may include: the sum of all scheduling cells where the span pattern is divided based on (X, Y)=(2, 2) and all scheduling cells whose subcarrier spacing is 15 KHz, and the sum of all scheduling cells where the span pattern is divided based on (X, Y)=(4, 3) and all scheduling cells whose subcarrier spacing is 15 KHz.

In this embodiment of the present application, the first threshold is the maximum BD value or the maximum CCE value per span per cell in a case where the subcarrier spacing is the target subcarrier spacing, and for example, when the first threshold is the maximum CCE value per span per cell in a case where the subcarrier spacing is the target subcarrier spacing as an example, the first threshold is $C_{PDCCH}^{max,span(X,Y),\mu}$ as shown in Table 2; and/or the first threshold is the maximum BD value or the maximum CCE value per slot per cell in a case where the subcarrier spacing is the target subcarrier spacing, and for example, when the first threshold is the maximum CCE value per slot per cell in a case where the subcarrier spacing is the target subcarrier spacing as an example, the first threshold is $C_{PDCCH}^{max,slot,\mu}$ as shown in Table 1, where per represents each, and cell represents cells.

In this embodiment of the present application, the second threshold is the maximum BD value or the maximum CCE value per span in a case where the subcarrier spacing is the target subcarrier spacing, and for example, when the second threshold is the maximum CCE value per span in a case where the subcarrier spacing is the target subcarrier spacing as an example, the second threshold is $C_{PDCCH}^{total,span(X,Y),\mu}$; and/or the second threshold is the maximum BD value or the maximum CCE value per slot in a case where the subcarrier spacing is the target subcarrier spacing, and for example, when the second threshold is the maximum CCE value per slot in a case where the subcarrier spacing is the target subcarrier spacing as an example, the second threshold is $C_{PDCCH}^{total,slot,\mu}$.

In this embodiment of the present application, the number of supported cells reported by the terminal includes one of the following: in a case of determining a second threshold in a slot, the number of supported cells reported by the terminal; in a case of determining a second threshold in a span, the number of supported cells reported by the terminal; or in a case of determining the second threshold in the span, numbers of supported cells reported by the terminal for different first parameters respectively.

For example, the number of supported cells reported by the terminal may be the number of supported cells reported by the terminal when the maximum BD value or the maximum CCE value per slot in a case where the subcarrier spacing is the target subcarrier spacing is determined. Alternatively, the number of supported cells reported by the terminal may also be the number of supported cells reported by the terminal when the maximum BD value or the maximum CCE value per span in a case where the subcarrier spacing is the target subcarrier spacing is determined. Alternatively, the number of supported cells reported by the terminal may also be the numbers of supported cells reported by the terminal for different Combinations (X,Y) when the maximum BD value or the maximum CCE value per span in a case where the subcarrier spacing is the target subcarrier spacing is determined. There may be many manners to determine the number of supported cells reported by the terminal, and the manners are not limited to the cases described in the above examples.

For example, in a case of determining the second threshold in a slot, the number of supported cells reported by the terminal is represented as $N_{cells}^{cap}$ whose value may be 4 to 16. Alternatively, in a case of determining the second threshold in a span, the number of supported cells reported by the terminal is represented as $N_{cells}^{cap\_span}$ whose value range may be integers not less than 4.

Alternatively, in a case of determining the second threshold in a span, the numbers of supported cells reported by the terminal for different first parameters are represented as $N_{cells}^{cap\_span(X,Y)}$ whose value range may be integers not less than 4.

Before the first threshold is determined, whether scheduling cells support enhanced physical downlink control channel monitoring capability needs to be determined. Assuming that all scheduling cells support enhanced physical downlink control channel monitoring capability, the first threshold may be the maximum BD value or the maximum CCE value per span per cell in a case where the subcarrier spacing is the target subcarrier spacing.

In a case where at least one scheduling cell does not support enhanced physical downlink control channel monitoring capability, the first threshold for a cell that does not support enhanced physical downlink control channel monitoring capability is determined in the following manner: a first threshold of at least one scheduling cell that does not support enhanced physical downlink control channel monitoring capability is determined as a first threshold in a span.

That enhanced physical downlink control channel monitoring capability is not supported means that the PDCCH monitoring capability in New Radio Release 16 (NR Rel-16)

is not supported, or that the maximum non-overlapping CCE value (or maximum BD value) determined by per span is not supported, or that the maximum non-overlapping CCE value (or maximum BD value) determined based on Combination (X, Y, μ) is not supported. In NR Rel-16, the PDCCH monitoring capability is enhanced, and the maximum CCE value (or maximum BD value) per span per cell is defined, which is referred to as R16 capability. In New Radio Release 15 (NR Rel-15), the PDCCH monitoring capability is the maximum CCE value (or maximum BD value) defined per slot per cell, as shown in Table 1, which is referred to as R15 capability.

In a case where at least one scheduling cell does not support enhanced physical downlink control channel monitoring capability, the first threshold for a cell that supports enhanced physical downlink control channel monitoring capability is determined in one of the following manners: a first threshold in a slot is used for the cell that supports enhanced physical downlink control channel monitoring capability; a first threshold in a slot is determined according to a first threshold in a span and the number of non-empty spans; a first threshold in a slot is determined according to a first threshold in a span and the number of spans; or a first threshold in a slot is determined according to a first threshold in a span and a preset value.

When the first threshold in a slot is used for a cell that supports enhanced physical downlink control channel monitoring capability, the threshold is the maximum CCE value or the maximum BD value per slot per cell in NR Rel-15 or the maximum CCE value or the maximum BD value per slot per cell newly defined in Rel-16.

When the first threshold in a slot is determined according to a first threshold in a span and a preset value, a preset value is determined for Combinations (X, Y) respectively. For example, the first threshold in a slot is determined through C(X, Y, μ)×preset value. Assuming that preset values for Combination (2, 2, μ), Combination (4, 3, μ) and Combination (7, 3, μ) are determined as 7, 3, and 2 respectively, the first threshold in a slot determined according to the first threshold in a span and the preset value is $C_{PDCCH}^{max\_span(2,2),\mu}*7$ $C_{PDCCH}^{max\_span(4,3),\mu}*3$ $C_{PDCCH}^{max\_span(7,3),\mu}*2$, respectively.

In a case where at least one scheduling cell does not support enhanced physical downlink control channel monitoring capability, the second threshold is determined for a cell that supports enhanced physical downlink control channel monitoring capability and the second threshold is determined for a cell that does not support enhanced physical downlink control channel monitoring capability, respectively. For example, for scheduling cells that support enhanced physical downlink control channel monitoring capability, the second threshold is determined according to the number of cells that meet the first set condition, the total number of downlink cells, the number of supported cells reported by the terminal and the maximum BD value or the maximum CCE value per span per cell in a case where the subcarrier spacing is the target subcarrier spacing. For example, for cells that do not support enhanced physical downlink control channel monitoring capability, the second threshold is determined according to the number of cells that meet the first set condition, the total number of downlink cells, the number of supported cells reported by the terminal and the maximum BD value or the maximum CCE value per slot per cell in a case where the subcarrier spacing is the target subcarrier spacing.

In a case where at least one scheduling cell does not support enhanced physical downlink control channel monitoring capability, the total number of downlink cells includes the total number of span-based downlink cells, and the total number of span-based downlink cells is determined through one of the following: a sum of numbers of all scheduled cells corresponding to scheduling cells that support enhanced physical downlink control channel monitoring capability, where in the present disclosure, all scheduled cells corresponding to scheduling cells include the scheduling cells themselves and scheduled cells scheduled by the scheduling cells; a sum of numbers of all scheduled cells corresponding to scheduling cells that support enhanced physical downlink control channel monitoring capability other than numbers of all scheduled cells corresponding to scheduling cells that are configured without enhanced physical downlink control channel monitoring capability; a sum of numbers of all scheduled cells corresponding to scheduling cells that support enhanced physical downlink control channel monitoring capability other than numbers of all scheduled cells corresponding to scheduling cells where a span pattern has only one span; a sum of numbers of all scheduled cells corresponding to scheduling cells that support enhanced physical downlink control channel monitoring capability other than numbers of all scheduled cells corresponding to scheduling cells that are not configured with first downlink control information, where the first downlink control information is downlink (DL) downlink control information (DCI) and uplink (UL) DCI newly defined in NR Rel-16 for scheduling unicast traffic, which also is Rel-16 new DCI or DCI Format 0_2/1_2; or a sum of numbers of all configured downlink cells.

In a case where at least one scheduling cell does not support enhanced physical downlink control channel monitoring capability, the total number of downlink cells includes the total number of slot-based downlink cells, and the total number of slot-based downlink cells is determined through one of the following: a sum of numbers of all configured downlink cells; a sum of numbers of all scheduled cells corresponding to scheduling cells that do not support enhanced physical downlink control channel monitoring capability, where the definition of all scheduled cells corresponding to scheduling cells has already been explained in the embodiment of the present application and will not be repeated herein; a sum of numbers of all scheduled cells corresponding to scheduling cells that do not support enhanced physical downlink control channel monitoring capability and numbers of all scheduled cells corresponding to scheduling cells that support enhanced physical downlink control channel monitoring capability and that are configured without enhanced physical downlink control channel monitoring capability; a sum of numbers of all scheduled cells corresponding to scheduling cells that do not support enhanced physical downlink control channel monitoring capability and numbers of all scheduled cells corresponding to scheduling cells where a span pattern has only one span among scheduling cells that support enhanced physical downlink control channel monitoring capability; or a sum of numbers of all scheduled cells corresponding to scheduling cells that do not support enhanced physical downlink control channel monitoring capability and numbers of all scheduled cells corresponding to scheduling cells that are not configured with first downlink information among scheduling cells that support enhanced physical downlink control channel monitoring capability, where the definition of the first downlink information has already been explained in the embodiment of the present application and will not be repeated herein.

In an example embodiment, for an ultra-reliable and low latency communications (URLLC) terminal in R16, compared to R15, the maximum number of blind decode (referred to BD threshold) and/or the maximum number of non-overlapping CCEs for channel estimation (referred to CCE threshold) are improved, and the BD threshold and/or the CCE threshold at a granularity of a span are defined. The following is described below using the CCE threshold as an example, and similarly, the BD threshold may also adopt the method described below.

In the cell aggregation scenario, the scheduling cells all support PDCCH monitoring capability enhancement, and according to the number of cells that meet the condition that a subcarrier spacing of a scheduling cell is the target subcarrier spacing and a span pattern is obtained based on the same first parameter, the total number of downlink cells, the number of supported cells reported by the terminal, and the maximum CCE value per span per cell in a case where the subcarrier spacing is the target subcarrier spacing, a second threshold of the target subcarrier spacing in a span is determined, thereby providing a solution to determining the maximum number of PDCCH detection candidate sets and the maximum number of non-overlapping CCEs of each subcarrier spacing in each span in a case where the scheduling cells all support PDCCH monitoring capability enhancement in the cell aggregation scenario, so as to avoid exceeding the terminal detection capability.

In the embodiment of the present disclosure, the total number of downlink cells is the total number of all downlink cells. Optionally, the total number of downlink cells may also be the total number of cells having fully or partially overlapping spans at the same moment.

For example, it is assumed that each scheduling cell obtains a span pattern based on Combination (2, 2). FIG. 2 is a structural schematic diagram of a frame structure according to an embodiment of the present application. As shown in FIG. 2, CC #0 cross-carrier schedules CC #0 to CC #3, CC #4 and CC #5 are both same-carrier scheduled (also referred to as self-carrier scheduling). At this point, assuming that the number of all downlink cells is used as the total number of downlink cells, that is, $$\sum_{j=0}^{3} N_{cells}^{DL,j} = 6$$

and the number of supported cells reported by the terminal $N_{cells}^{cap}=4$, the maximum number of non-overlapping CCEs of each span for each subcarrier spacing, which is also known as the maximum CCE value, is calculated through $$C_{PDCCH}^{total,span(X,Y),\mu} = \left\lfloor N_{cells}^{cap} \cdot C_{PDCCH}^{max,span(X,Y),\mu} \cdot N_{cells}^{DL,span(X,Y),\mu} / \sum_{j=0}^{3} N_{cells}^{DL,j} \right\rfloor,$$

as shown in Table 3.

This embodiment of the present application is described using the calculation of the maximum CCE value as an example, and the maximum BD value is calculated in a similar manner, that is $$M_{PDCCH}^{total,span(X,Y),\mu} = \left\lfloor N_{cells}^{cap} \cdot M_{PDCCH}^{max,span(X,Y),\mu} \cdot N_{cells}^{DL,span(X,Y),\mu} / \sum_{j=0}^{3} N_{cells}^{DL,j} \right\rfloor,$$

which will not be given as an example.

TABLE 3

| Maximum CCE values of different combinations (X, Y) in each span | | |
|---|---|---|
| CCE number allocation | Per span CCE upper limit of scheduling cells for each subcarrier spacing $C_{PDCCH}^{total,span(2,2),\mu} = \left\lfloor N_{cells}^{cap} \cdot C_{PDCCH}^{\max,span(2,2),\mu} \cdot N_{cells}^{DL,\mu} \middle/ \sum_{j=0}^{3} N_{cells}^{DL,j} \right\rfloor$ | Per span CCE upper limit of scheduling cells for scheduled cell $\min(C_{PDCCH}^{max,span(X,Y),\mu}, C_{PDCCH}^{total,span(X,Y),\mu})$ |
| 15 KHz 5 CCs | CCE_span (2, 2): ⌊5 * 16 * 4/6⌋ = 53 | CCE_span (2, 2): 16 |
| 30 KHz 1 CC | CCE_span (2, 2): ⌊1* 16 * 4/6⌋ = 10 | CCE_span (2, 2): 10 |
| 60 KHz 0 CC | — | — |
| 120 KHz 0 CC | — | — |

For example, assuming that all scheduling cells in FIG. 2 are same-carrier scheduled, that is, CC #0 to CC #5 have no cell indicator field (CIF) (that is, CIF=0), the per span CCE upper limit for each subcarrier spacing is shown in Table 4.

TABLE 4

| Maximum CCE values of different combinations (X, Y) in each span | | |
|---|---|---|
| CCE number allocation | Per span CCE upper limit of scheduling cells for each subcarrier spacing $C_{PDCCH}^{total,span(X,Y),\mu} = \left\lfloor N_{cells}^{cap} \cdot C_{PDCCH}^{\max,span(X,Y),\mu} \cdot N_{cells}^{DL,span(X,Y),\mu} \middle/ \sum_{j=0}^{3} N_{cells}^{DL,j} \right\rfloor$ | Per span CCE upper limit of scheduling cells for each scheduled cell $\min(C_{PDCCH}^{max,span(X,Y),\mu}, C_{PDCCH}^{total,span(X,Y),\mu})$ |
| 15 KHz 2 CCs | CCE_span (2, 2): ⌊2 * 16 * 4/6⌋ = 21 | CCE_span (2, 2): 16 |

TABLE 4-continued

Maximum CCE values of different combinations (X, Y) in each span

| CCE number allocation | Per span CCE upper limit of scheduling cells for each subcarrier spacing $C_{PDCCH}^{total,span(X,Y),\mu} = \left\lfloor N_{cells}^{cap} \cdot C_{PDCCH}^{\max,span(X,Y),\mu} \cdot N_{cells}^{DL,span(X,Y),\mu} \Big/ \sum_{j=0}^{3} N_{cells}^{DL,j} \right\rfloor$ | Per span CCE upper limit of scheduling cells for each scheduled cell $\min(C_{PDCCH}^{max,span(X,Y),\mu}, C_{PDCCH}^{total,span(X,Y),\mu})$ |
|---|---|---|
| 30 KHz 2 CC | CCE_span (2, 2): ⌊2 * 16 * 4/6⌋ = 21 | CCE_span (2, 2): 16 |
| 60 KHz 1 CC | CCE_span (2, 2): ⌊1 * 16 * 4/6⌋ = 10 | CCE_span (2, 2): 10 |
| 120 KHz 1 CC | CCE_span (2, 2): ⌊1 * 16 * 4/6⌋ = 10 | CCE_span (2, 2): 10 |

In an example embodiment, in the cell aggregation scenario, part of the scheduling cells supports PDCCH monitoring capability enhancement while part of the scheduling cells does not support PDCCH monitoring capability enhancement. This embodiment is described using an example where the cells with subcarrier spacing of 15 KHz and 30 KHz support PDCCH monitoring capability enhancement while the cells with subcarrier spacing of 60 KHz and 120 KHz do not support PDCCH monitoring capability enhancement, but is not limited to thereto.

According to the number of cells that meet the first set condition, the total number of downlink cells, the number of supported cells reported by the terminal and the first threshold, a second threshold of a target subcarrier spacing is determined, thereby providing a solution to determining the maximum number of PDCCH detection candidate sets and the maximum number of non-overlapping CCEs of each subcarrier spacing in each span in a case where part of scheduling cells support PDCCH monitoring capability enhancement in the cell aggregation scenario, so as to avoid exceeding the terminal detection capability.

In this embodiment, for scheduling cells that support PDCCH monitoring capability enhancement, the number of cells that meet the first set condition is the number of cells that meet the condition that the subcarrier spacing of a scheduling cell is the target subcarrier spacing and a span pattern is obtained based on the same first parameter. For scheduling cells that do not support PDCCH monitoring capability enhancement, the number of cells that meet the first set condition is the number of cells that meet the condition that the subcarrier spacing of a scheduling cell is the target subcarrier spacing. For a scheduling cell that does not support PDCCH monitoring capability enhancement, a first threshold of the scheduling cell in a slot is used as a first threshold in a span.

For example, in a case where cells with subcarrier spacing of 15 KHz and 30 KHz support PDCCH monitoring capability enhancement, examples of the maximum CCE values of different Combinations (X, Y) in 15 KHz and 30 KHz cells are shown in Table 5, and it is to be noted that the values are not limited to Table 5.

TABLE 5

Maximum CCE values of different combinations (X, Y) in each cell

| Combination | X | Y | C (Maximum CCE value $C_{PDCCH}^{max,\ span(X,\ Y),\ \mu}$) μ = 0 | μ = 1 | μ = 2 | μ = 3 |
|---|---|---|---|---|---|---|
| Combination 1 | 2 | 2 | 16 | 16 | — | — |
| Combination 2 | 4 | 3 | 36 | 36 | — | — |
| Combination 3 | 7 | 3 | 56 | 56 | — | — |

Figure 3:
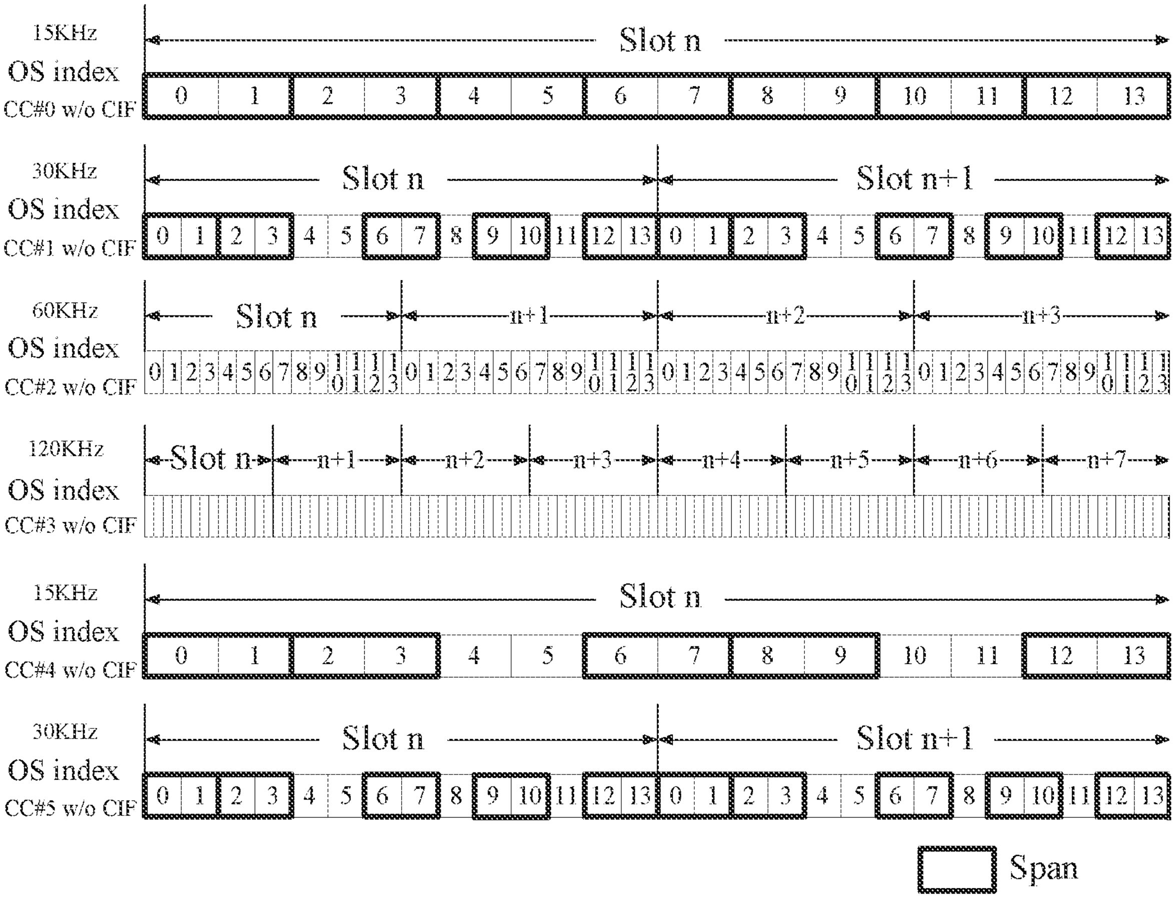
FIG. 3 is a structural schematic diagram of another frame structure according to an embodiment of the present application.

It is assumed that each scheduling cell that supports PDCCH monitoring capability enhancement obtains a span pattern based on Combination (2, 2). FIG. 3 is a structural schematic diagram of another frame structure according to an embodiment of the present application. As shown in FIG. 3, CC #0 to CC #5 are all same-carrier scheduled. For a scheduling cell that does not support PDCCH monitoring capability enhancement, a first threshold of the scheduling cell that does not support enhanced physical downlink control channel monitoring capability in a slot is used as a first threshold in a span. For example, the first threshold is the maximum BD value or the maximum CCE value per slot per cell in a case where the subcarrier spacing is the target subcarrier spacing, and for example, when the first threshold is the maximum CCE value per slot per cell in a case where the subcarrier spacing is the target subcarrier spacing, the first threshold is $C_{PDCCH}^{max,slot,\mu}$ as shown in Table 1. In a case where cells with subcarrier spacing of 60 KHz and 120 KHz do not support PDCCH monitoring capability enhancement, one slot of 60 KHz and 120 KHz may be used as one span, and CCE_span (slot) may be used as CCE_span (X, Y).

At this point, assuming that the number of all downlink cells is used as the total number of downlink cells, that is, $$\sum_{j=0}^{3} N_{cells}^{DL,j} = 6$$

and the number of supported cells reported by the terminal $N_{cells}^{cap}=4$, the maximum CCE value of each span for each subcarrier spacing is calculated through $$C_{PDCCH}^{total,span(X,Y),\mu} = \left\lfloor N_{cells}^{cap} \cdot C_{PDCCH}^{max,span(X,Y),\mu} \cdot N_{cells}^{DL,span(X,Y),\mu} \Big/ \sum_{j=0}^{3} N_{cells}^{DL,j} \right\rfloor,$$

as shown in Table 6.

TABLE 6

Maximum CCE values of different combinations (X, Y) in each span

| CCE number allocation | Per span CCE upper limit of scheduling cells for each subcarrier spacing $C_{PDCCH}^{total,span(X,Y),\mu} = \left\lfloor N_{cells}^{cap} \cdot C_{PDCCH}^{max,span(X,Y),\mu} \cdot N_{cells}^{DL,span(X,Y),\mu} \Big/ \sum_{j=0}^{3} N_{cells}^{DL,j} \right\rfloor$ | Per span CCE upper limit of scheduling cells for each scheduled cell $\min(C_{PDCCH}^{max,span(X,Y),\mu}, C_{PDCCH}^{total,span(X,Y),\mu})$ |
|---|---|---|
| 15 KHz 2 CCs | CCE_span (2, 2): ⌊2 * 16 * 4/6⌋ = 21 | CCE_span (2, 2): 16 |
| 30 KHz 2 CCs | CCE_span (2, 2): ⌊2* 16 * 4/6⌋ = 21 | CCE_span (2, 2): 16 |
| 60 KHz 1 CC | CCE_span (slot): ⌊1 * 48 * 4/6⌋ = 32 | CCE_span (slot): 32 |
| 120 KHz 1 CC | CCE span (slot): ⌊1 * 32 * 4/6⌋ = 21 | CCE_span (slot): 21 |

In an example embodiment, in the cell aggregation scenario, part of the scheduling cells supports PDCCH monitoring capability enhancement while part of the scheduling cells does not support PDCCH monitoring capability enhancement. This embodiment is described using an example where the cells with subcarrier spacing of 15 KHz and 30 KHz support PDCCH monitoring capability enhancement while the cells with subcarrier spacing of 60 KHz and 120 KHz do not support PDCCH monitoring capability enhancement, but is not limited to thereto.

According to the number of cells that meet the first set condition, the total number of downlink cells, the number of supported cells reported by the terminal and the first threshold, a second threshold of a target subcarrier spacing is determined, thereby providing a solution to determining the maximum number of PDCCH detection candidate sets and the maximum number of non-overlapping CCEs of each subcarrier spacing in each span in a case where part of scheduling cells support PDCCH monitoring capability enhancement in the cell aggregation scenario, so as to avoid exceeding the terminal detection capability.

The manner of determining the number of cells that meet the first set condition is the same as the manner used in the embodiments described above, and details are not repeated herein.

The manner of determining the number of supported cells reported by the terminal is the same as the manner used in the embodiments described above, and details are not repeated herein.

In this embodiment, for scheduling cells that do not support PDCCH monitoring capability enhancement, the total number of downlink cells includes the total number of slot-based downlink cells, and the total number of slot-based downlink cells is determined through one of the following manners: a sum of numbers of all configured downlink cells; a sum of numbers of all scheduled cells corresponding to scheduling cells that do not support enhanced physical downlink control channel monitoring capability; a sum of numbers of all scheduled cells corresponding to scheduling cells that do not support enhanced physical downlink control channel monitoring capability and numbers of all scheduled cells corresponding to scheduling cells that support enhanced physical downlink control channel monitoring capability and that are configured without enhanced physical downlink control channel monitoring capability; a sum of numbers of all scheduled cells corresponding to scheduling cells that do not support enhanced physical downlink control channel monitoring capability and numbers of all scheduled cells corresponding to scheduling cells where a span pattern has only one span among scheduling cells that support enhanced physical downlink control channel monitoring capability; or a sum of numbers of all scheduled cells corresponding to scheduling cells that do not support enhanced physical downlink control channel monitoring capability and numbers of all scheduled cells corresponding to scheduling cells that are not configured with first downlink information among scheduling cells that support enhanced physical downlink control channel monitoring capability.

In this embodiment, for scheduling cells that support enhanced physical downlink control channel monitoring capability, the total number of downlink cells includes the total number of span-based downlink cells, and the total number of span-based downlink cells is determined through one of the following: a sum of numbers of all scheduled cells corresponding to scheduling cells that support enhanced physical downlink control channel monitoring capability; a sum of numbers of all scheduled cells corresponding to scheduling cells that support enhanced physical downlink control channel monitoring capability other than numbers of all scheduled cells corresponding to scheduling cells that are configured without enhanced physical downlink control channel monitoring capability; a sum of numbers of all scheduled cells corresponding to scheduling cells that support enhanced physical downlink control channel monitoring capability other than numbers of all scheduled cells corresponding to scheduling cells where a span pattern has only one span; a sum of numbers of all scheduled cells corresponding to scheduling cells that support enhanced physical downlink control channel monitoring capability other than numbers of all scheduled cells corresponding to scheduling cells that are not configured with first downlink control information; or a sum of numbers of all configured downlink cells.

Any manner of determining the total number of downlink cells for scheduling cells that do not support PDCCH monitoring capability enhancement may be combined with any manner of determining the total number of downlink cells for scheduling cells that support PDCCH monitoring capability enhancement to determine the total number of downlink cells.

In this embodiment, for scheduling cells that support PDCCH monitoring capability enhancement, the first threshold is determined in one of the following manners (that is, the span-based PDCCH monitoring capability is converted into the slot-based PDCCH monitoring capability in one of the following manners): a first threshold in a slot is used for a cell that supports enhanced physical downlink control channel monitoring capability; or a first threshold in a slot is determined according to a first threshold in a span and the number of non-empty spans; or a first threshold in a slot is determined according to a first threshold in a span and the number of spans; or a first threshold in a slot is determined according to a first threshold in a span and a preset value.

For example, for scheduling cells that support PDCCH monitoring capability enhancement, a threshold in a slot is used as the first threshold.

At this point, assuming that the number of all downlink cells is used as the total number of downlink cells, that is, $$\sum_{j=0}^{3} N_{cells}^{DL,j} = 6$$

and the number of supported cells reported by the terminal $N_{cells}^{cap}=4$, the maximum CCE value of each slot for each subcarrier spacing is calculated through $$C_{PDCCH}^{total,slot,\mu} = \left\lfloor N_{cells}^{cap} \cdot C_{PDCCH}^{max,slot,\mu} \cdot N_{cells}^{DL,\mu} / \sum_{j=0}^{3} N_{cells}^{DL,j} \right\rfloor,$$

as shown in Table 7.

TABLE 7

| Maximum CCE value in each slot | | |
|---|---|---|
| CCE number allocation | Per slot CCE upper limit of scheduling cells for each subcarrier spacing $C_{PDCCH}^{total,slot,\mu} = \left\lfloor N_{cells}^{cap} \cdot C_{PDCCH}^{\max,slot,\mu} \cdot N_{cells}^{DL,\mu} / \sum_{j=0}^{3} N_{cells}^{DL,j} \right\rfloor$ | Per slot CCE upper limit of scheduling cells for each scheduled cell $\min(C_{PDCCH}^{max,slot,\mu}, C_{PDCCH}^{total,slot,\mu})$ |
| 15 KHz 2 CCs | CCE: ⌊2 * 56 * 4/6 = 74⌋ | CCE: 56 |
| 30 KHz 2 CCs | CCE: ⌊2* 56 * 4/6 = 74⌋ | CCE: 56 |
| 60 KHz 1 CC | CCE: ⌊1 * 48 * 4/6 = 32⌋ | CCE: 32 |
| 120 KHz 1 CC | CCE: ⌊1 * 32 * 4/6 = 21⌋ | CCE: 21 |

For example, for scheduling cells that support PDCCH monitoring capability enhancement, a first threshold in a slot is determined according to a first threshold in a span and a number of non-empty spans. At this point, it is assumed that each scheduling cell that supports PDCCH monitoring capability enhancement obtains a span pattern based on Combination (2, 2), as shown in FIG. 3. It is assumed that in FIG. 3, the number of non-empty spans in the current slot in the span pattern of CC #0 is 5, and after conversion, there are 16*5=80 non-empty spans; the number of non-empty spans in the current slot in the span pattern of CC #1 is 4, and after conversion, there are 16*4=64 non-empty spans; the number of non-empty spans in the current slot in the span pattern of CC #4 is 4, and after conversion, there are 16*4=64 non-empty spans; and the number of non-empty spans in the current slot in the span pattern of CC #5 is 4, and after conversion, there are 16*4=64 non-empty spans. The second threshold is calculated after the first thresholds of different scheduling cells with the same subcarrier spacing are added.

Assuming that the number of all downlink cells is used as the total number of downlink cells, that is, $$\sum_{j=0}^{3} N_{cells}^{DL,j} = 6$$

and the number of supported cells reported by the terminal $N_{cells}^{cap}=4$, the maximum CCE value of each slot for each subcarrier spacing/target subcarrier spacing is as shown in Table 8.

TABLE 8

| Maximum CCE value in each slot | | |
|---|---|---|
| CCE number allocation | Per slot CCE upper limit of scheduling cells for each subcarrier spacing $C_{PDCCH}^{total,slot,\mu} = \left\lfloor N_{cells}^{cap} \cdot \sum_{n=1}^{N_{cells}^{DL,\mu}} C_{PDCCH}^{\max,slot,\mu,n} \Big/ \sum_{j=0}^{3} N_{cells}^{DL,j} \right\rfloor$ | Per slot CCE upper limit of scheduling cells for each scheduled cell $\min(C_{PDCCH}^{max,slot,\mu}, C_{PDCCH}^{total,slot,\mu})$ |
| 15 KHz 2 CCs | CCE: $\lfloor(80 + 64) * 4/6\rfloor = 96$ | CCE: 56 |
| 30 KHz 2 CCs | CCE: $\lfloor(64 + 64) * 4/6\rfloor = 85$ | CCE: 56 |
| 60 KHz 1 CC | CCE: $\lfloor 1 * 48 * 4/6\rfloor = 32$ | CCE: 32 |
| 120 KHz 1 CC | CCE: $\lfloor 1 * 32 * 4/6\rfloor = 21$ | CCE: 21 |

For example, for scheduling cells that support PDCCH monitoring capability enhancement, a first threshold in a slot is determined according to a first threshold in a span and a number of spans. At this point, it is assumed that each scheduling cell that supports PDCCH monitoring capability enhancement obtains a span pattern based on Combination (2, 2), as shown in FIG. 3. It is assumed that in FIG. 3, the number of spans in the span pattern of CC #0 is 7, and after conversion, there are 16*7=112 spans; the number of spans in the span pattern of CC #1 is 5, and after conversion, there are 16*4=64 spans; the number of spans in the span pattern of CC #4 is 5, and after conversion, there are 16*5=80 spans; and the number of spans in the span pattern of CC #5 is 5, and after conversion, there are 16*5=80 spans. The second threshold is calculated after the first thresholds of different scheduling cells with the same subcarrier spacing are added.

Assuming that the number of all downlink cells is used as the total number of downlink cells, that is $$\sum_{j=0}^{3} N_{cells}^{DL,j} = 6$$

and the number of supported cells reported by the terminal $N_{cells}^{cap}=4$, the maximum CCE value of each slot for each subcarrier spacing is as shown in Table 9.

TABLE 9

| Maximum CCE value in each slot | | |
|---|---|---|
| CCE number allocation | Per slot CCE upper limit of scheduling cells for each subcarrier spacing $C_{PDCCH}^{total,slot,\mu} = \left\lfloor N_{cells}^{cap} \cdot \sum_{n=1}^{N_{cells}^{DL,\mu}} C_{PDCCH}^{\max,slot,\mu,n} \Big/ \sum_{j=0}^{3} N_{cells}^{DL,j} \right\rfloor$ | Per slot CCE upper limit of scheduling cells for each scheduled cell $\min(C_{PDCCH}^{max,slot,\mu}, C_{PDCCH}^{total,slot,\mu})$ |
| 15 KHz 2 CCs | CCE: $\lfloor(112 + 80) * 4/6\rfloor = 128$ | CCE: 56 |
| 30 KHz 2 CCs | CCE: $\lfloor(80 + 80) * 4/6\rfloor = 106$ | CCE: 56 |
| 60 KHz 1 CC | CCE: $\lfloor 1 * 48 * 4/6\rfloor = 32$ | CCE: 32 |
| 120 KHz 1 CC | CCE: $\lfloor 1 * 32 * 4/6\rfloor = 21$ | CCE: 21 |

For example, for scheduling cells that support PDCCH monitoring capability enhancement, a first threshold in a slot is determined according to a first threshold in a span and a preset value. It is assumed that each scheduling cell that supports PDCCH monitoring capability enhancement obtains a span pattern based on Combination (2, 2). At this point, the preset value is determined as 7 for Combination (2, 2), then for CC #0, the first threshold is 16*7=112, for CC #1, the first threshold is 16*7=112, for CC #4, the first threshold is 16*7=112, and for CC #5, the first threshold is 16*7=112. The second threshold is calculated after the first thresholds of different scheduling cells with the same subcarrier spacing are added.

Assuming that the number of all downlink cells is used as the total number of downlink cells, that is, $$\sum_{j=0}^{3} N_{cells}^{DL,j} = 6$$

and the number of supported cells reported by the terminal $N_{cells}^{cap}=4$, the maximum CCE value of each slot for each subcarrier spacing is as shown in Table 10.

TABLE 10

| Maximum CCE value in each slot | | |
|---|---|---|
| CCE number allocation | Per slot CCE upper limit of scheduling cells for each subcarrier spacing $C_{PDCCH}^{total,slot,\mu} = \left\lfloor N_{cells}^{cap} \cdot \sum_{n=1}^{N_{cells}^{DL,\mu}} C_{PDCCH}^{\max,slot,\mu,n} \Big/ \sum_{j=0}^{3} N_{cells}^{DL,j} \right\rfloor$ | Per slot CCE upper limit of scheduling cells for each scheduled cell $\min(C_{PDCCH}^{max,slot,\mu}, C_{PDCCH}^{total,slot,\mu})$ |
| 15 KHz 2 CCs | CCE: $\lfloor(112 + 112) * 4/6\rfloor = 149$ | CCE: 56 |
| 30 KHz 2 CCs | CCE: $\lfloor(112 + 112) * 4/6\rfloor = 149$ | CCE: 56 |
| 60 KHz 1 CC | CCE: $\lfloor 1 * 48 * 4/6\rfloor = 32$ | CCE: 32 |
| 120 KHz 1 CC | CCE: $\lfloor 1 * 32 * 4/6\rfloor = 21$ | CCE: 21 |

In an example embodiment, in the cell aggregation scenario, part of the scheduling cells supports PDCCH monitoring capability enhancement while part of the scheduling cells does not support PDCCH monitoring capability enhancement. This embodiment is described using an example where the cells with subcarrier spacing of 15 KHz and 30 KHz support PDCCH monitoring capability enhancement while the cells with subcarrier spacing of 60 KHz and 120 KHz do not support PDCCH monitoring capability enhancement, but is not limited to thereto. In another example, for one cell or a group of cells, a base station configures the one cell or the group of cells to support PDCCH monitoring capability enhancement or not to support PDCCH monitoring capability enhancement.

In a case where at least one scheduling cell does not support enhanced physical downlink control channel monitoring capability, the second threshold is determined for a cell that supports enhanced physical downlink control channel monitoring capability and the second threshold is determined for a cell that does not support enhanced physical downlink control channel monitoring capability, respectively, thereby providing a solution to determining the maximum number of PDCCH detection candidate sets and the maximum number of non-overlapping CCEs of each subcarrier spacing in each span in a case where part of scheduling cells support PDCCH monitoring capability enhancement in the cell aggregation scenario, so as to avoid exceeding the terminal detection capability.

The manner determining the total number of downlink cells is the same as the manner used in the embodiments described above, the manner of determining the number of cells that meet the first set condition is the same as the manner used in the embodiments described above, and the manner of determining the number of supported cells reported by the terminal is the same as the manner used in the embodiments described above.

For scheduling cells that do not support PDCCH monitoring capability enhancement, a threshold in a slot is used as the first threshold (which, for example, is obtained according to Table 1). For scheduling cells that support PDCCH monitoring capability enhancement, a threshold in a span is used as the first threshold (which, for example, is obtained according to Table 5).

Figure 4:
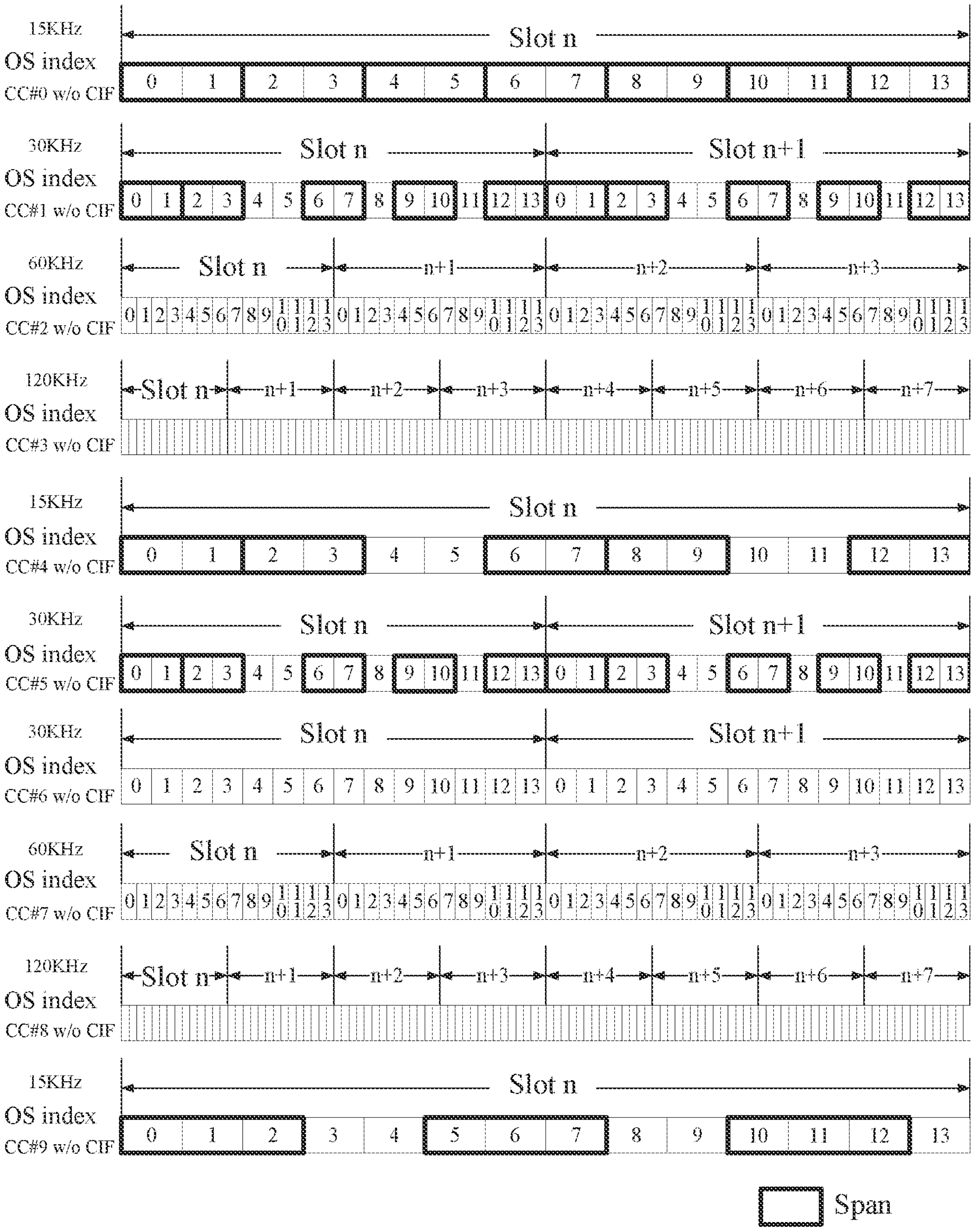
FIG. 4 is a structural schematic diagram of another frame structure according to an embodiment of the present application.

It is assumed that each scheduling cell that supports PDCCH monitoring capability enhancement obtains a span pattern based on Combination (2, 2). FIG. 4 is a structural schematic diagram of another frame structure according to an embodiment of the present application. As shown in FIG. 4, CC #0 to CC #9 are all same-carrier scheduled. Assuming that the total number $$\sum_{j=0}^{3} N_{cells}^{DL,slot,j}$$

of slot-based downlink cells equals to 5, the total number $$\sum_{j=0}^{3} N_{cells}^{DL,span,j}$$

of span-based downlink cells equals to 5 and the number $N_{cells}^{cap}$ of supported cells reported by the terminal equals to 4, the maximum CCE value of each span for each subcarrier spacing is as shown in Table 11, and the maximum CCE value of each slot for each subcarrier spacing is as shown in Table 12.

TABLE 11

| Maximum CCE values of different combinations (X, Y) in each span | | |
|---|---|---|
| CCE number allocation | Per slot CCE upper limit of scheduling cells for each subcarrier spacing $C_{PDCCH}^{total,span(X,Y),\mu} = \left\lfloor N_{cells}^{cap} \cdot C_{PDCCH}^{\max,span(X,Y),\mu} \cdot N_{cells}^{DL,span(X,Y),\mu} \Big/ \sum_{j=0}^{3} N_{cells}^{DL,span,} \right\rfloor$ | Per slot CCE upper limit of scheduling cells for each scheduled cell $\min(C_{PDCCH}^{max,slot,\mu}, C_{PDCCH}^{total,slot,\mu})$ |
| 15 KHz 3 CCs | CCE_span (2, 2): $\lfloor 2 * 16 * 4/5\rfloor = 25$<br>CCE_span (4, 3): $\lfloor 1 * 36 * 4/5\rfloor = 28$ | CCE_span (2, 2): 16<br>CCE_span (4, 3): 28 |
| 30 KHz 2 CCs | CCE_span (2, 2): $\lfloor 2 * 16 * 4/5\rfloor = 25$ | CCE_span (2, 2): 16 |

TABLE 11-continued

| Maximum CCE values of different combinations (X, Y) in each span | | |
|---|---|---|
| CCE number allocation | Per slot CCE upper limit of scheduling cells for each subcarrier spacing $C_{PDCCH}^{total,span(X,Y),\mu} = \left\lfloor N_{cells}^{cap} \cdot C_{PDCCH}^{\max,span(X,Y),\mu} \cdot N_{cells}^{DL,span(X,Y),\mu} \Big/ \sum_{j=0}^{3} N_{cells}^{DL,span,} \right\rfloor$ | Per slot CCE upper limit of scheduling cells for each scheduled cell $\min(C_{PDCCH}^{max,slot,\mu}, C_{PDCCH}^{total,slot,\mu})$ |
| 60 KHz 0 CC | — | — |
| 120 KHz 0 CC | — | — |

TABLE 12

| Maximum CCE value in each slot | | |
|---|---|---|
| CCE number allocation | Per slot CCE upper limit of scheduling cells for each subcarrier spacing $C_{PDCCH}^{total,slot,\mu} = \left\lfloor N_{cells}^{cap} \cdot \sum_{n=1}^{N_{cells}^{DL,\mu}} C_{PDCCH}^{\max,slot,\mu,n} \Big/ \sum_{j=0}^{3} N_{cells}^{DL,slot,j} \right\rfloor$ | Per slot CCE upper limit of scheduling cells for each scheduled cell $\min(C_{PDCCH}^{max,slot,\mu}, C_{PDCCH}^{total,slot,\mu})$ |
| 15 KHz 3 CCs | — | — |
| 30 KHz 1 CC | CCE: $\lfloor 1 * 56 * 4/5 \rfloor = 44$ | CCE: 44 |
| 60 KHz 2 CCs | CCE: $\lfloor 2 * 48 * 4/5 \rfloor = 76$ | CCE: 48 |
| 120 KHz 2 CCs | CCE: $\lfloor 2 * 32 * 4/5 \rfloor = 51$ | CCE: 32 |

In FIGS. 2 to 4, CC is the abbreviation for scheduling cell. Correspondingly, CC #0 to CC #9 represent scheduling cells with different numbers. OS is the abbreviation of orthogonal frequency division multiplexing symbol (OFDM symbol), and the corresponding OS index represents the orthogonal frequency division multiplexing symbol index. CIF is the abbreviation for cell indicator field. W/o represents without. CIF=0 has the same meaning as w/o CIF, which both represent the same-carrier scheduling.

In NR Rel-15, the PDCCH monitoring capability is the maximum BD value (or maximum CCE value) defined per slot per cell, which is referred to as R15 capability. In NR Rel-16, the PDCCH monitoring capability is enhanced, and the maximum CCE value (or maximum BD value) per span per cell is defined, which is referred to as R16 capability. However, the manner of using the R15 capability and the R16 capability is not given in the related art. One possible manner is to use the R15 capability for enhanced Mobile Broadband (eMBB) traffic and the R16 capability for URLLC traffic. Another possible manner is to configure the terminal to use R15 capability or R16 capability, regardless of the type of traffic. The above-mentioned manner one limits R16 to only one traffic type while manner two cannot use the R15 capability and the R16 capability simultaneously, and both the manners have certain limitations.

An embodiment of the present application provides a threshold usage method. The method includes: a method for using different thresholds is determined according to one of the following manners: different thresholds are used for different downlink control information formats respectively; different thresholds are used for different search spaces respectively; or different search space sets are configured for the same threshold, and different sub-thresholds are configured for the different search space sets respectively.

In this embodiment, the manner in which different thresholds are used for different downlink control information formats respectively includes: a downlink control information format is acquired; and a threshold to be used is determined according to the downlink control information format; where the threshold includes a slot-based first threshold and a span-based second threshold.

This embodiment provides a threshold usage method, which can enable the PDCCH monitoring capability enhancement to be applied to the scheduling of a plurality of traffic types, thereby achieving the flexible usage of the enhanced PDCCH monitoring capability.

For example, the R15 capability is used for R15 downlink control information, and the R16 capability is used for R16 downlink control information. R16 downlink control information is a new downlink control information (DCI) format introduced by NR Release 16 (for example, the new DCI format is a DCI format for scheduling an uplink traffic channel and a DCI format for scheduling a downlink traffic channel), which is used for scheduling both R16 URLLC traffic and eMBB traffic. At this point, the R16 capability is bound with the R16 DCI, which can schedule both the eMBB traffic and the URLLC traffic.

In this embodiment, the manner in which different search space sets are configured for the same threshold, and different sub-thresholds are configured for the different search space sets respectively includes: in a case of configuring a span-based second threshold, at least two groups of search space sets are configured; and a sub-threshold corresponding to each of the two groups of search space sets is determined respectively, where optionally, the sub-threshold corresponding to each of the two groups of search space sets is distinguished through a higher-layer configuration or predefinition.

For example, when the R16 capability is configured, X groups of search space sets are configured, and a second threshold C_x, x=0, 1, . . . , X−1 corresponding to each group of search space sets is determined respectively, and the sum of the second threshold corresponding to each group is the R16 capability. Optionally, X=2, and at this point, second thresholds C_0 and C_1 corresponding to two groups are used for eMBB and URLLC respectively, or used for eMBB and eMBB/URLLC respectively, or used for R15 DCI and R16 DCI respectively, or used for R15 DCI and R15 DCI/R16 DCI respectively, where eMBB/URLLC represents eMBB and URLLC, and R15 DCI/R16 DCI represents R15 DCI and R16 DCI.

In this embodiment, the manner in which different thresholds are used for different search space sets respectively includes: configuration information of a search space is acquired; and a threshold to be used is determined according to the configuration information; where the threshold includes a slot-based first threshold and a span-based second threshold.

The threshold to be used is determined according to the configuration information in the following manner: in a case where first downlink control information and second downlink control information are configured in the same search space, a threshold to be used is determined according to a priority or a traffic type indicated in the first downlink control information.

Optionally, the first downlink control information may be DL DCI and UL DCI newly defined in NR Rel-16 for scheduling unicast traffic, which also is Rel-16 new DCI or DCI Format 0_2/1_2.

The second downlink control information may be DL DCI and UL DCI already existing in NR Rel-15 for scheduling unicast traffic, which also is Rel-15 non-fallback DCI or DCI Format 0_1/1_1.

For example, if the traffic type indicated in the first downlink control information is URLLC (or a high priority), the threshold to be used is a span-based second threshold.

In a case where no first downlink control information and second downlink control information is detected, the method further includes: one threshold is randomly selected as a threshold to be used; or one threshold is randomly selected as a threshold to be used, and in a case where used resources or detection times exceed the threshold to be used, one of remaining thresholds is used as a threshold to be used; or the sum of all thresholds is calculated, and a calculation result is used as a threshold to be used.

In this embodiment, the threshold to be used is determined according to the configuration information in the following manner: in a case where first downlink control information and second downlink control information are configured in the same search space, a span-based second threshold to be used is determined according to the first downlink control information, and a slot-based first threshold to be used is determined according to the second downlink control information.

The manner of determining the threshold to be used in a case where no first downlink control information and second downlink control information is detected is the same as the manner used in the embodiments described above, and details are not repeated herein.

In this embodiment, the configuration information of a search space is acquired in the following manner: a candidate set and an initial control channel unit are configured for first downlink control information and a candidate set and an initial control channel unit are configured for second downlink control information in a search space, respectively, and the candidate sets and the initial control channel units are used as the configuration information.

Through the above solution, in a case where first downlink control information and second downlink control information are configured in the same search space, the R15 capability and the R16 capability can be distinguished so that the enhanced PDCCH monitoring capability and the R15 PDCCH monitoring capability can be fully used, thereby improving the scheduling flexibility.

The candidate (X, Y) set reported by the terminal in the embodiments described above may include at least one of: {(7, 3)}, {(4, 3), (7, 3)} or {(2, 2), (4, 3), (7, 3)}. A span pattern in a slot is determined through a candidate (X, Y) set reported by the terminal and a PDCCH CORESET as well as a search space. The number of spans does not exceed floor (14/X), where X is the minimum X in Combination (X, Y) reported by the terminal. Since the minimum X equals to 2, the number of spans does not exceed 7. When the number of monitoring opportunities (MO) corresponding to allocated search spaces (SSs) is greater than 7, the acquired span is invalid.

Therefore, the terminal needs to discard/not to detect some monitoring opportunities so that the number of monitoring opportunities is not greater than 7. Therefore, how to determine monitoring opportunities to be discarded is an urgent problem to be solved.

An embodiment of the present application provides an information adjustment method. The method includes: in a case where the number of monitoring opportunities corresponding to search spaces exceeds a set threshold, monitoring opportunities that meet a set condition are discarded.

Through the solution of this embodiment, spans can be effectively allocated so that the enhanced PDCCH monitoring capability can be used, thereby improving the scheduling flexibility.

The set condition includes one of the following: discarding is performed based on an order of indexes of search spaces; discarding is performed based on an order of lengths of control resource sets corresponding to search spaces or lengths of control resource sets corresponding to monitoring opportunities; or discarding is performed based on an order of numbers of monitoring opportunities corresponding to search spaces.

In an example embodiment, in a case where the number of monitoring opportunities corresponding to search spaces exceeds the set threshold, discarding performed based on the order of indexes of search spaces may be optimized to: in a case where the number of monitoring opportunities corresponding to search spaces exceeds the set threshold, monitoring opportunities are discarded based on the order of indexes of search spaces from large to small until the number of monitoring opportunities is not greater than 7.

FIG. 5 is a structural diagram of an original monitoring opportunity configuration according to an embodiment of the present application. As shown in FIG. 5, the number of configured monitoring opportunities is 8, which exceeds 7, and the numbers at the slash background in the figure represent search space indexes. In an example embodiment, in a case where the number of monitoring opportunities corresponding to search spaces exceeds the set threshold, discarding performed based on the order of lengths of control resource sets corresponding to search spaces or lengths of control resource sets corresponding to monitoring opportunities may be optimized to: in a case where the number of monitoring opportunities corresponding to search spaces exceeds the set threshold, monitoring opportunities are discarded based on the order of lengths of control resource sets corresponding to search spaces from large to small or the order of lengths of control resource sets corresponding to monitoring opportunities from large to small until the number of monitoring opportunities is not greater than 7. FIG. 6 is a structural diagram of a monitoring opportunity configuration after discarding processing according to an embodiment of the present application. As shown in FIG. 6, the monitoring opportunity where the length of the control resource set corresponding to the search spaces is 2 symbols is discarded to ensure that the number of monitoring opportunities does not exceed 7 so that span allocation is valid.

In an example embodiment, when the number of monitoring opportunities corresponding to search spaces exceeds the set threshold, discarding performed based on the order of numbers of monitoring opportunities corresponding to search spaces may be optimized to: in a case where the number of monitoring opportunities corresponding to search spaces exceeds the set threshold, monitoring opportunities are discarded based on the order of numbers of monitoring opportunities corresponding to search spaces from large to small until the number of monitoring opportunities is not greater than 7.

Optionally, for one search space having multiple monitoring opportunities, the order of discarding monitoring opportunities includes: monitoring opportunities are discarded from large to small or from small to large according to OFDM symbol indexes; or the monitoring opportunities adjacent to a monitoring opportunity of a larger CORESET duration are discarded first.

FIG. 7 is a structural diagram of another original monitoring opportunity configuration according to an embodiment of the present application. As shown in FIG. 7, the number of configured MOs is 8, which exceeds 7. The numbers at the slash background in the figure represent search space indexes. FIG. 8 is a structural diagram of another monitoring opportunity configuration after discarding processing according to an embodiment of the present application. As shown in FIG. 8, a monitoring opportunity in the search space having 5 monitoring opportunities is discarded to ensure that the number of monitoring opportunities does not exceed 7 so that span allocation is valid.

The granularity of the enhanced frequency domain resource allocation type 1 (FDRA Type 1, a continuous resource allocation mode) is configured by a radio resource control (RRC) parameter. Optionally, the configuration value is an integer number of resource blocks (RBs), for example, 1, 2, 4, 8 or 16 RBs. The granularity is a starting granularity and a length indication granularity with the same value. However, in practical applications, no RRC parameter may be configured, which leads to the incorrect reception of traffic channels.

An embodiment of the present application provides an information adjustment method. The method includes the following: in a case where a granularity configuration parameter of an enhanced frequency domain resource allocation type 1 is not configured, a default value of the granularity configuration parameter is determined as: one RB or one resource block group (RBG).

For example, in a case where no RRC parameter is configured, the RRC parameter may be determined in one of the following manners: the default value of the granularity configuration parameter is determined as one RB, that is, the granularity is considered the same as Rel-15 FDRA type 1 granularity by default; the default value of the granularity configuration parameter is determined as one RBG (when the RBG is configured), where the RBG size is a resource block size configured for FDRA Type 0, that is, the granularity is considered the same as the RBG granularity in a system by default; or the default value is one RBG when RBGs are configured and the default value is one RB when no RBG is configured.

Through the solution provided by this embodiment, when no RRC parameter is configured, the accurate value can be obtained so that the inconsistent understanding between the terminal and the base station is avoided, thereby ensuring the correct reception of traffic channels.

Figure 9:
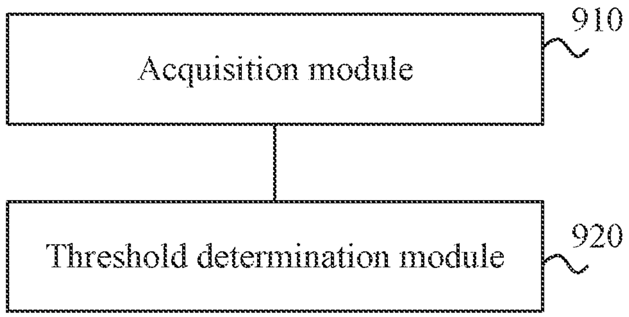
FIG. 9 is a structural schematic diagram of an information determination apparatus according to an embodiment of the present application.

FIG. 9 is a structural schematic diagram of an information determination apparatus according to an embodiment of the present application. The apparatus executes the information determination method to avoid exceeding the terminal detection capability. As shown in FIG. 9, the information determination apparatus of this embodiment includes: an acquisition module 910, which is configured to acquire the number of cells that meet a first set condition, the total number of downlink cells, the number of supported cells reported by a terminal, and a first threshold; and a threshold determination module 920, which is configured to determine a second threshold of a target subcarrier spacing according to the number of cells that meet the first set condition, the total number of downlink cells, the number of supported cells reported by the terminal, and the first threshold.

The information determination apparatus provided in this embodiment of the present application is configured to perform the information determination method of the embodiments described above. The implementation principles and effects of the information determination apparatus are similar to those of the information determination method, and details are not repeated herein.

In an embodiment, the first set condition includes at least one of the following: a subcarrier spacing of a scheduling cell is the target subcarrier spacing; or a subcarrier spacing of a scheduling cell is the target subcarrier spacing and a span pattern is obtained based on a same first parameter.

In an embodiment, the number of supported cells reported by the terminal includes one of the following: in a case of determining a second threshold in a slot, the number of supported cells reported by the terminal; in a case of determining a second threshold in a span, the number of supported cells reported by the terminal; or in a case of determining the second threshold in the span, numbers of supported cells reported by the terminal for different first parameters respectively.

In an embodiment, in a case where at least one scheduling cell does not support enhanced physical downlink control channel monitoring capability, the first threshold for a cell that does not support enhanced physical downlink control channel monitoring capability is determined in the following manner: a first threshold of at least one scheduling cell that does not support enhanced physical downlink control channel monitoring capability is determined as a first threshold in a span.

In an embodiment, in a case where at least one scheduling cell does not support enhanced physical downlink control channel monitoring capability, the first threshold for a cell that supports enhanced physical downlink control channel monitoring capability is determined in the following manner: a first threshold in a slot is used for the cell that supports enhanced physical downlink control channel monitoring capability; a first threshold in a slot is determined according to a first threshold in a span and the number of non-empty spans; a first threshold in a slot is determined according to a first threshold in a span and the number of spans; or a first threshold in a slot is determined according to a first threshold in a span and a preset value.

In an embodiment, in a case where at least one scheduling cell does not support enhanced physical downlink control channel monitoring capability, the second threshold is determined for a cell that supports enhanced physical downlink control channel monitoring capability and the second threshold is determined for a cell that does not support enhanced physical downlink control channel monitoring capability, respectively.

In an embodiment, the total number of downlink cells includes the total number of span-based downlink cells, and the total number of span-based downlink cells is determined through one of the following: a sum of numbers of all scheduled cells corresponding to scheduling cells that support enhanced physical downlink control channel monitoring capability; a sum of numbers of all scheduled cells corresponding to scheduling cells that support enhanced physical downlink control channel monitoring capability other than numbers of all scheduled cells corresponding to scheduling cells that are configured without enhanced physical downlink control channel monitoring capability; a sum of numbers of all scheduled cells corresponding to scheduling cells that support enhanced physical downlink control channel monitoring capability other than numbers of all scheduled cells corresponding to scheduling cells where a span pattern has only one span; a sum of numbers of all scheduled cells corresponding to scheduling cells that support enhanced physical downlink control channel monitoring capability other than numbers of all scheduled cells corresponding to scheduling cells that are not configured with first downlink control information; or a sum of numbers of all configured downlink cells.

In this embodiment, the total number of downlink cells includes the total number of slot-based downlink cells, and the total number of slot-based downlink cells is determined through one of the following: a sum of numbers of all configured downlink cells; a sum of numbers of all scheduled cells corresponding to scheduling cells that do not support enhanced physical downlink control channel monitoring capability; a sum of numbers of all scheduled cells corresponding to scheduling cells that do not support enhanced physical downlink control channel monitoring capability and numbers of all scheduled cells corresponding to scheduling cells that support enhanced physical downlink control channel monitoring capability and that are configured without enhanced physical downlink control channel monitoring capability; a sum of numbers of all scheduled cells corresponding to scheduling cells that do not support enhanced physical downlink control channel monitoring capability and numbers of all scheduled cells corresponding to scheduling cells where a span pattern has only one span among scheduling cells that support enhanced physical downlink control channel monitoring capability; or a sum of numbers of all scheduled cells corresponding to scheduling cells that do not support enhanced physical downlink control channel monitoring capability and numbers of all scheduled cells corresponding to scheduling cells that are not configured with first downlink information among scheduling cells that support enhanced physical downlink control channel monitoring capability.

An embodiment of the present disclosure provides a threshold usage apparatus. The threshold usage apparatus is configured to: determine a method for using different thresholds according to one of the following manners: different thresholds are used for different downlink control information formats respectively; different thresholds are used for different search spaces respectively; or different search space sets are configured for the same threshold, and different sub-thresholds are configured for the different search space sets respectively.

The threshold usage apparatus provided in this embodiment of the present application is configured to perform the threshold usage method of the embodiments described above. The implementation principles and effects of the threshold usage apparatus are similar to those of the threshold usage method, and details are not repeated herein.

In an embodiment, the manner in which different thresholds are used for different downlink control information formats respectively includes: a downlink control information format is acquired; and a threshold to be used is determined according to the downlink control information format; where the threshold includes a slot-based first threshold and a span-based second threshold.

In an embodiment, the manner in which different search space sets are configured for the same threshold, and different sub-thresholds are configured for the different search space sets respectively includes: in a case of configuring a span-based second threshold, at least two groups of search space sets are configured; and a sub-threshold corresponding to each of the two groups of search space sets is determined respectively, where optionally, the sub-threshold corresponding to each of the two groups of search space sets is distinguished through a higher-layer configuration or predefinition.

In an embodiment, the manner in which different thresholds are used for different search space sets respectively includes: configuration information of a search space is acquired; and a threshold to be used is determined according to the configuration information; where the threshold includes a slot-based first threshold and a span-based second threshold.

In an embodiment, the threshold to be used is determined according to the configuration information in the following manner: in a case where first downlink control information and second downlink control information are configured in the same search space, a threshold to be used is determined according to a priority or a traffic type indicated in the first downlink control information.

In an embodiment, the threshold to be used is determined according to the configuration information in the following manner: in a case where first downlink control information and second downlink control information are configured in the same search space, a span-based second threshold to be used is determined according to the first downlink control information, and a slot-based first threshold to be used is determined according to the second downlink control information.

In an embodiment, in a case where no first downlink control information and second downlink control information is detected, the method further includes: one threshold is randomly selected as a threshold to be used; or one threshold is randomly selected as a threshold to be used, and in a case where used resources or detection times exceed the threshold to be used, one of remaining thresholds is used as a threshold to be used; or the sum of all thresholds is calculated, and a calculation result is used as a threshold to be used.

In an embodiment, the configuration information of a search space is acquired in the following manner: a candidate set and an initial control channel unit are configured for first downlink control information and a candidate set and an initial control channel unit are configured for second downlink control information in a search space, respectively, and the candidate sets and the initial control channel units are used as the configuration information.

An embodiment of the present application further provides an information adjustment apparatus. The information adjustment apparatus is configured to: in a case where the number of monitoring opportunities corresponding to search spaces exceeds a set threshold, discard monitoring opportunities that meet a set condition.

The information adjustment apparatus provided in this embodiment of the present application is configured to perform the information adjustment method of the embodiments described above. The implementation principles and effects of the information adjustment apparatus are similar to those of the information adjustment method, and details are not repeated herein.

In an embodiment, the set condition includes one of the following: discarding is performed based on an order of indexes of search spaces; discarding is performed based on an order of lengths of control resource sets corresponding to search spaces or lengths of control resource sets corresponding to monitoring opportunities; or discarding is performed based on an order of numbers of monitoring opportunities corresponding to search spaces.

An embodiment of the present application provides another information adjustment apparatus. The information adjustment apparatus is configured to: in a case where a granularity configuration parameter of an enhanced frequency domain resource allocation type 1 is not configured, determine a default value of the granularity configuration parameter as one RB or one RBG.

The information adjustment apparatus provided in this embodiment of the present application is configured to perform the information adjustment method of the embodiments described above. The implementation principles and effects of the information adjustment apparatus are similar to those of the information adjustment method, and details are not repeated herein.

The preceding are only example embodiments of the present application and are not intended to limit the scope of the present application.

An embodiment of the present application provides a terminal. The terminal includes a memory and one or more processors. The memory is configured to store one or more programs, and the one or more programs, when executed by the one or more processors, enable the one or more processors to perform the methods described in the embodiments of the present application.

The terminal provided above may be configured to perform the method provided by any embodiment described above, and has corresponding functions and effects.

An embodiment of the present application provides a base station. The base station includes a memory and one or more processors. The memory is configured to store one or more programs, and the one or more programs, when executed by the one or more processors, enable the one or more processors to perform the methods described in the embodiments of the present application.

The base station provided above may be configured to perform the method provided by any embodiment described above, and has corresponding functions and effects.

An embodiment of the present disclosure further provides a storage medium storing executable instructions, and computer-executable instructions, when executed by a computer processor, perform the methods described in the embodiments of the present application.

The preceding are only example embodiments of the present application and are not intended to limit the scope of the present application.

Various embodiments of the present application may be implemented in hardware or special-purpose circuits, software, logic or any combination thereof. For example, some aspects may be implemented in hardware while other aspects may be implemented in firmware or software that may be executed by a controller, a microprocessor, or other computing apparatuses, though the present application is not limited thereto.

A block diagram of any logic flow among the drawings of the present application may represent program steps, may represent interconnected logic circuits, modules, and functions, or may represent a combination of program steps with logic circuits, modules, and functions. Computer programs may be stored in a memory. The memory may be of any type suitable for a local technical environment and may be implemented using any suitable data storage technology, such as, but not limited to, a read-only memory (ROM), a random-access memory (RAM), and an optical memory apparatus and system (digital video disc (DVD) or compact disc (CD)). Computer-readable media may include non-transitory storage media. The data processor may be of any type suitable for the local technical environment, such as, but not limited to, a general-purpose computer, a special-purpose computer, a microprocessor, a digital signal processor (DSP), an application-specific integrated circuit (ASIC), a field-programmable gate array (FPGA), and a processor based on a multi-core processor architecture.

What is claimed is:

1. A wireless communication method, comprising:

performing a first determination, by a terminal configured with a number of downlink cells, for at least a first scheduling cell that supports an enhanced physical downlink control channel monitoring capability, a first maximum number of physical downlink control channel (PDCCH) detection candidate sets, a second maximum number of non-overlapping control channel elements (CCEs) for a first subcarrier spacing, and a span pattern that is determined based on (X, Y), wherein an interval between starts of two spans is not less than X symbols, wherein Y indicates a number of symbols in a span, and wherein the first maximum number and the second maximum number are determined for each span in a plurality of spans included in a time slot;

performing a second determination, by the terminal, for at least a second scheduling cell that does not support the enhanced physical downlink control channel monitoring capability, a third maximum number of PDCCH detection candidate sets and a fourth maximum number of non-overlapping CCEs for a second subcarrier spacing, wherein the third maximum number and the fourth maximum number are determined for each slot in a plurality of slots; and performing, by the terminal, an operation related to a monitoring opportunity using the first maximum number, the second maximum number, the third maximum number, or the fourth maximum number.

2. The method of claim 1, wherein the first maximum number of PDCCH detection candidate sets is determined according to a first number of cells that meet a condition, a first total number of downlink cells, a first number of supported cells reported by the terminal, and a first maximum number of PDCCH candidate sets in the span, and wherein the second maximum number of non-overlapping CCEs is determined according to the first number of cells that meet the condition, the first total number of downlink cells, the first number of supported cells reported by the terminal, and a first maximum number of non-overlapping CCEs in the span.

3. The method of claim 2, wherein the first number of supported cells is reported by the terminal for determining the first maximum number of PDCCH detection candidate sets and the second maximum number of non-overlapping CCEs in the span.

4. The method of claim 2, wherein the first total number of downlink cells comprises a total number of span-based downlink cells, and wherein the total number of span-based downlink cells is a total numbers of scheduled cells corresponding to scheduling cells that support the enhanced physical downlink control channel monitoring capability.

5. The method of claim 2, wherein the first maximum number of non-overlapping CCEs in the span is 36 in response the first subcarrier spacing being 15 KHz and the span pattern being (4, 3), wherein the first maximum number of non-overlapping CCEs in the span is 36 in response the first subcarrier spacing being 30 KHz and the span pattern being (4, 3), wherein the first maximum number of non-overlapping CCEs in the span is 56 in response the first subcarrier spacing being 15 KHz and the span pattern being (7, 3), and wherein the first maximum number of non-overlapping CCEs in the span is 56 in response the first subcarrier spacing being 30 KHz and the span pattern being (7, 3).

6. The method of claim 1, wherein the third maximum number of PDCCH detection candidate sets is determined according to a second number of cells that meet a condition, a second total number of downlink cells, a second number of supported cells reported by the terminal, and a second maximum number of PDCCH candidate sets in a slot, and wherein the fourth maximum number non-overlapping CCEs is determined according to the second number of cells that meet the condition, the second total number of downlink cells, the second number of supported cells reported by the terminal, and the second maximum number of non-overlapping CCEs in the slot.

7. The method of claim 6, wherein the second number of supported cells is reported by the terminal for determining the third maximum number of PDCCH detection candidate sets and the fourth maximum number of non-overlapping CCEs in the slot.

8. The method of claim 6, wherein the second total number of downlink cells comprises a total number of slot-based downlink cells, and wherein the total number of slot-based downlink cells is a total number of scheduled cells corresponding to scheduling cells that do not support the enhanced physical downlink control channel monitoring capability.

9. The method of claim 1, further comprising:

receiving, by the terminal, a configuration that indicates that the first scheduling cell supports the enhanced physical downlink control channel monitoring capability and that the second scheduling cell does not support the enhanced physical downlink control channel monitoring capability.

10. An apparatus for wireless communication, comprising:

a processor, configured to implement a method, the processor when configured causes the apparatus to:

perform a first determination, by a terminal configured with a number of downlink cells, for at least a first scheduling cell that supports an enhanced physical downlink control channel monitoring capability, a first maximum number of physical downlink control channel (PDCCH) detection candidate sets, a second maximum number of non-overlapping control channel elements (CCEs) for a first subcarrier spacing, and a span pattern that is determined based on (X, Y), wherein an interval between starts of two spans is not less than X symbols, wherein Y indicates a number of symbols in a span, and wherein the first maximum number and the second maximum number are determined for each span in a plurality of spans included in a time slot;

perform a second determination, by the terminal, for at least a second scheduling cell that does not support the enhanced physical downlink control channel monitoring capability, a third maximum number of PDCCH detection candidate sets and a fourth maximum number of non-overlapping CCEs for a second subcarrier spacing, wherein the third maximum number and the fourth maximum number are determined for each slot in a plurality of slots; and perform, by the terminal, an operation related to a monitoring opportunity using the first maximum number, the second maximum number, the third maximum number, or the fourth maximum number.

11. The apparatus of claim 10, wherein the first maximum number of PDCCH detection candidate sets is determined according to a first number of cells that meet a condition, a first total number of downlink cells, a first number of supported cells reported by the terminal, and a first maximum number of PDCCH candidate sets in the span, and wherein the second maximum number of non-overlapping CCEs is determined according to the first number of cells that meet the condition, the first total number of downlink cells, the first number of supported cells reported by the terminal, and a first maximum number of non-overlapping CCEs in the span.

12. The apparatus of claim 11, wherein the first number of supported cells is reported by the terminal for determining the first maximum number of PDCCH detection candidate sets and the second maximum number of non-overlapping CCEs in the span.

13. The apparatus of claim 11, wherein the first total number of downlink cells comprises a total number of span-based downlink cells, and wherein the total number of span-based downlink cells is a total numbers of scheduled cells corresponding to scheduling cells that support the enhanced physical downlink control channel monitoring capability.

14. The apparatus of claim 11, wherein the first maximum number of non-overlapping CCEs in the span is 36 in response the first subcarrier spacing being 15 KHz and the span pattern being (4, 3), wherein the first maximum number of non-overlapping CCEs in the span is 36 in response the first subcarrier spacing being 30 KHz and the span pattern being (4, 3), wherein the first maximum number of non-overlapping CCEs in the span is 56 in response the first subcarrier spacing being 15 KHz and the span pattern being (7, 3), and wherein the first maximum number of non-overlapping CCEs in the span is 56 in response the first subcarrier spacing being 30 KHz and the span pattern being (7, 3).

15. The apparatus of claim 10, wherein the third maximum number of PDCCH detection candidate sets is determined according to a second number of cells that meet a condition, a second total number of downlink cells, a second number of supported cells reported by the terminal, and a second maximum number of PDCCH candidate sets in a slot, and wherein the fourth maximum number non-overlapping CCEs is determined according to the second number of cells that meet the condition, the second total number of downlink cells, the second number of supported cells reported by the terminal, and the second maximum number of non-overlapping CCEs in the slot.

16. The apparatus of claim 15, wherein the second number of supported cells is reported by the terminal for determining the third maximum number of PDCCH detection candidate sets and the fourth maximum number of non-overlapping CCEs in the slot.

17. The apparatus of claim 15, wherein the second total number of downlink cells comprises a total number of slot-based downlink cells, and wherein the total number of slot-based downlink cells is a total number of scheduled cells corresponding to scheduling cells that do not support the enhanced physical downlink control channel monitoring capability.

18. The apparatus of claim 10, wherein the processor is further configured to:

receive a configuration that indicates that the first scheduling cell supports the enhanced physical downlink control channel monitoring capability and that the second scheduling cell does not support the enhanced physical downlink control channel monitoring capability.

19. A non-transitory computer readable program storage medium having code stored thereon, the code, when executed by a processor, causing the processor to implement a method, comprising:

performing a first determination, by a terminal configured with a number of downlink cells, for at least a first scheduling cell that supports an enhanced physical downlink control channel monitoring capability, a first maximum number of physical downlink control channel (PDCCH) detection candidate sets, a second maximum number of non-overlapping control channel elements (CCEs) for a first subcarrier spacing, and a span pattern that is determined based on (X, Y), wherein an interval between starts of two spans is not less than X symbols, wherein Y indicates a number of symbols in a span, and wherein the first maximum number and the second maximum number are determined for each span in a plurality of spans included in a time slot;

performing a second determination, by the terminal, for at least a second scheduling cell that does not support the enhanced physical downlink control channel monitoring capability, a third maximum number of PDCCH detection candidate sets and a fourth maximum number of non-overlapping CCEs for a second subcarrier spacing, wherein the third maximum number and the fourth maximum number are determined for each slot in a plurality of slots; and performing, by the terminal, an operation related to a monitoring opportunity using the first maximum number, the second maximum number, the third maximum number, or the fourth maximum number.

20. The non-transitory computer readable program storage medium of claim 19, wherein the first maximum number of PDCCH detection candidate sets is determined according to a first number of cells that meet a condition, a first total number of downlink cells, a first number of supported cells reported by the terminal, and a first maximum number of PDCCH candidate sets in the span, and wherein the second maximum number of non-overlapping CCEs is determined according to the first number of cells that meet the condition, the first total number of downlink cells, the first number of supported cells reported by the terminal, and a first maximum number of non-overlapping CCEs in the span.

* * * * *

UNITED STATES PATENT AND TRADEMARK OFFICE

CERTIFICATE OF CORRECTION

PATENT NO. : 12,095,706 B2
APPLICATION NO. : 17/765377
DATED : September 17, 2024
INVENTOR(S) : Jing Shi et al.

It is certified that error appears in the above-identified patent and that said Letters Patent is hereby corrected as shown below:

In the Claims

Column 30; Lines 37-41:
Delete "downlink control channel monitoring capability, a first maximum number of physical downlink control channel (PDCCH) detection candidate sets, a second maximum number of non-overlapping control channel elements (CCEs) for a first subcarrier spacing, and a span"
Replace with --downlink control channel monitoring capability, of a first maximum number of physical downlink control channel (PDCCH) detection candidate sets and a second maximum number of non-overlapping control channel elements (CCEs), for a first subcarrier spacing and a span--

Column 30; Lines 51-52:
Delete "enhanced physical downlink control channel monitoring capability, a third maximum number of PDCCH"
Replace with --enhanced physical downlink control channel monitoring capability, of a third maximum number of PDCCH--

Column 31; Line 49:
Delete "reported by the terminal, and the second maximum"
Replace with --reported by the terminal, and a second maximum--

Column 32; Lines 11-15:
Delete "downlink control channel monitoring capability, a first maximum number of physical downlink control channel (PDCCH) detection candidate sets, a second maximum number of non-overlapping control channel elements (CCEs) for a first subcarrier spacing, and a span"
Replace with --downlink control channel monitoring capability, of a first maximum number of physical downlink control channel (PDCCH) detection candidate sets and a second maximum number of non-overlapping control channel elements (CCEs), for a first subcarrier spacing and a span--

Signed and Sealed this
Twelfth Day of November, 2024

Katherine Kelly Vidal

Katherine Kelly Vidal
*Director of the United States Patent and Trademark Office*

Column 32; Lines 26-27:
Delete “enhanced physical downlink control channel monitoring capability, a third maximum number of PDCCH”
Replace with --enhanced physical downlink control channel monitoring capability, of a third maximum number of PDCCH--

Column 33; Line 24:
Delete “reported by the terminal, and the second maximum”
Replace with --reported by the terminal, and a second maximum--

Column 34; Lines 8-12:
Delete “downlink control channel monitoring capability, a first maximum number of physical downlink control channel (PDCCH) detection candidate sets, a second maximum number of non-overlapping control channel elements (CCEs) for a first subcarrier spacing, and a span”
Replace with --downlink control channel monitoring capability, of a first maximum number of physical downlink control channel (PDCCH) detection candidate sets and a second maximum number of non-overlapping control channel elements (CCEs), for a first subcarrier spacing and a span--

Column 34; Lines 21-22:
Delete “enhanced physical downlink control channel monitoring capability, a third maximum number of PDCCH”
Replace with --enhanced physical downlink control channel monitoring capability, of a third maximum number of PDCCH--